(12) United States Patent
Mountz et al.

(10) Patent No.: US 9,792,577 B2
(45) Date of Patent: Oct. 17, 2017

(54) FILLING AN ORDER AT AN INVENTORY PIER

(71) Applicant: Amazon Technologies, Inc., Reno, NV (US)

(72) Inventors: Michael C. Mountz, Lexington, MA (US); Peter R. Wurman, Acton, MA (US); Steven A. Wilson, Boston, MA (US); Caroline F. Mallary, Reading, MA (US); Zhouzhou Peng, Acton, MA (US); Joseph W. Durham, Somerville, MA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/644,591

(22) Filed: Oct. 4, 2012

(65) Prior Publication Data

US 2014/0100715 A1    Apr. 10, 2014

(51) Int. Cl.
*B65G 1/137*   (2006.01)
*G06Q 10/08*   (2012.01)

(52) U.S. Cl.
CPC ................ *G06Q 10/087* (2013.01)

(58) Field of Classification Search
CPC .................................................. G06Q 10/087
See application file for complete search history.

(56) References Cited

U.S. PATENT DOCUMENTS

| | | | |
|---|---|---|---|
| 4,786,229 A | 11/1988 | Henderson | |
| 5,395,206 A * | 3/1995 | Cerny, Jr. | B65G 1/1378 414/270 |
| 6,061,607 A * | 5/2000 | Bradley | B65G 1/1376 414/273 |
| 6,505,093 B1 | 1/2003 | Thatcher et al. | |
| 6,748,292 B2 | 6/2004 | Mountz | |
| 6,895,301 B2 | 5/2005 | Mountz | |
| 6,950,722 B2 | 9/2005 | Mountz | |
| 7,402,018 B2 | 7/2008 | Mountz et al. | |
| 7,826,919 B2 | 11/2010 | D'Andrea et al. | |

(Continued)

FOREIGN PATENT DOCUMENTS

| | | |
|---|---|---|
| JP | 2006327796 | 12/2006 |
| JP | 2009073661 | 4/2009 |

(Continued)

OTHER PUBLICATIONS

PCT, Communication regarding Application No. PCT/US 13/63176 dated Mar. 10, 2014.

(Continued)

*Primary Examiner* — Talia Crawley
(74) *Attorney, Agent, or Firm* — Baker Botts L.L.P.

(57) ABSTRACT

A system includes a inventory pier and a mobile drive unit. The inventory pier includes a first side and a second side. The first side includes defined areas at which inventory holders are designated to be stationed. The inventory pier is operable to receive inventory items from at least one of the inventory holders at least one of the defined areas. The mobile drive unit is operable to transport an order holder along the second side of the inventory pier, wherein the order holder is operable to receive an inventory item from the inventory pier at a location along the second side of the inventory pier.

24 Claims, 8 Drawing Sheets

(56) References Cited

U.S. PATENT DOCUMENTS

| | | | |
|---|---|---|---|
| 7,850,413 | B2 | 12/2010 | Fontana |
| 7,873,496 | B2 | 1/2011 | Gajic |
| 7,894,932 | B2 | 2/2011 | Mountz et al. |
| 7,894,933 | B2 | 2/2011 | Mountz et al. |
| 7,912,574 | B2 | 3/2011 | Wurman et al. |
| 7,920,962 | B2 | 4/2011 | D'Andrea et al. |
| 8,068,978 | B2 | 11/2011 | D'Andrea et al. |
| 8,170,711 | B2 | 5/2012 | D'Andrea et al. |
| 8,220,710 | B2 | 7/2012 | Hoffman et al. |
| 8,239,291 | B2 | 8/2012 | Hoffman et al. |
| 8,280,546 | B2 | 10/2012 | D'Andrea et al. |
| 8,280,547 | B2 | 10/2012 | D'Andrea et al. |
| 8,311,902 | B2 | 11/2012 | Mountz et al. |
| 8,412,400 | B2 | 4/2013 | D'Andrea et al. |
| 8,444,369 | B2 | 5/2013 | Watt et al. |
| 8,483,869 | B2 | 7/2013 | Wurman et al. |
| 8,538,692 | B2 | 9/2013 | Wurman et al. |
| 8,606,392 | B2 | 12/2013 | Wurman et al. |
| 9,321,591 | B2 * | 4/2016 | Lert ................... B65G 1/0492 |
| 9,499,338 | B2 * | 11/2016 | Toebes ............... B65G 1/0492 |
| 9,598,239 | B2 * | 3/2017 | Lert, Jr. ............. B65G 1/0492 |
| 9,630,774 | B2 | 4/2017 | Traversa ............ B65G 1/065 |
| 2004/0010337 | A1 | 1/2004 | Mountz |
| 2006/0210382 | A1 * | 9/2006 | Mountz ................ B60D 1/465 |
| | | | 414/498 |
| 2007/0017984 | A1 | 1/2007 | Mountz et al. |
| 2007/0021864 | A1 * | 1/2007 | Mountz .............. G06Q 10/087 |
| | | | 700/216 |
| 2008/0025833 | A1 | 1/2008 | Baker et al. |
| 2008/0167884 | A1 * | 7/2008 | Mountz .............. G06Q 10/087 |
| | | | 705/29 |
| 2009/0082902 | A1 * | 3/2009 | Foltz ................. G06Q 10/087 |
| | | | 700/214 |
| 2009/0136333 | A1 * | 5/2009 | Schafer .............. B65G 1/1378 |
| | | | 414/807 |
| 2009/0216364 | A1 * | 8/2009 | Grissom ............ G06Q 10/087 |
| | | | 700/214 |
| 2009/0299521 | A1 | 12/2009 | Hansl et al. |
| 2011/0153063 | A1 | 6/2011 | Wurman et al. |
| 2011/0200420 | A1 | 8/2011 | Driskill et al. |
| 2012/0072431 | A1 | 3/2012 | Berlener et al. |
| 2012/0143427 | A1 | 6/2012 | Hoffman et al. |
| 2012/0282070 | A1 | 11/2012 | D'Andrea et al. |
| 2012/0330458 | A1 * | 12/2012 | Weiss .................... B66F 9/063 |
| | | | 700/216 |
| 2013/0054005 | A1 | 2/2013 | Stevens et al. |
| 2013/0103552 | A1 | 4/2013 | Hoffman et al. |
| 2013/0173049 | A1 | 7/2013 | Brunner et al. |
| 2013/0226649 | A1 * | 8/2013 | Grissom .......... G06Q 10/06315 |
| | | | 705/7.25 |
| 2013/0302132 | A1 | 11/2013 | D'Andrea |
| 2014/0100998 | A1 | 4/2014 | Mountz et al. |
| 2014/0100999 | A1 | 4/2014 | Mountz et al. |
| 2014/0324491 | A1 * | 10/2014 | Banks ................ G06Q 10/087 |
| | | | 705/7.12 |
| 2016/0236866 | A1 * | 8/2016 | Sullivan ............. B65G 1/0492 |

FOREIGN PATENT DOCUMENTS

| | | | |
|---|---|---|---|
| JP | 2010514646 | 5/2010 | |
| WO | WO 00/43931 | 7/2000 | ............. G06F 17/60 |
| WO | WO 2011/107385 | 9/2011 | ............. B65G 1/137 |

OTHER PUBLICATIONS

U.S. Appl. No. 13/644,646, filed Oct. 4, 2012, Mountz.
U.S. Appl. No. 13/644,679, filed Oct. 4, 2012, Mountz.
Picklists, from www.opentaps.org, Dec. 2009 (downloaded Oct. 2, 2014).
USPTO Notice of Allowance and Fee(s) Due, Inventors: Mountz et al., U.S. Appl. No. 13/644,646, Sep. 30, 2014.
USPTO Advisory Action, Inventors: Mountz et al., U.S. Appl. No. 13/644,679, Aug. 27, 2014.
USPTO Final Office Action, Inventors: Mountz et al., U.S. Appl. No. 13/644,679, Jun. 19, 2014.
USPTO Non-Final Office Action, Inventors: Mountz et al., U.S. Appl. No. 13/644,679, Dec. 4, 2013.
*Notice of Appeal*, U.S. Appl. No. 13/644,679, Inventors: Mountz et al., Sep. 19, 2014.
*Amendment Response to Final Office Action*, U.S. Appl. No. 13/644,679, Inventors: Mountz et al., Aug. 12, 2014.
*Amendment Response to Non-Final Office Action*, U.S. Appl. No. 13/644,679, Inventors: Mountz et al., Feb. 24, 2014.
*Appeal Brief*, U.S. Appl. No. 13/644,679, Inventors: Mountz et al., Nov. 19, 2014.
Communication from the European Patent Office; Extended European Search report for Appl. No. 13844366.8, May 3, 2016; 7 pages.
Communication from the Japanese Patent Office; Notice of Reasons for Rejection re: 2015-535776 dated Jul. 19, 2016; 12 pages.
State Intellectual Property Office of the People's Republic of China; The First Office Action, and Search Report; English Translation dated Jun. 19, 2017 included; Application No. 201380058814.4; Jun. 2, 2017 (Jun. 2, 2017).
Notice of Reason(s) for Rejection from the Japanese Patent Office; English Translation included; Application No. 2015-535776 dated May 23, 2017.

* cited by examiner

FILLING AN ORDER AT AN INVENTORY PIER

BACKGROUND OF THE INVENTION

Modern inventory systems face increasing demands to efficiently fulfill orders despite increasing complexity and diversity of inventories and orders. Inventory systems suffering from inefficient use of system resources face lower system throughput, unfinished or delayed tasks, and unacceptable response times. Accordingly, such inventory systems face the challenge of making more efficient use of time, space, equipment, and manpower in order to meet those rising demands.

BRIEF DESCRIPTION OF DRAWINGS

For a more complete understanding of the present invention and its advantages, reference is now made to the following description, taken in conjunction with the accompanying drawings, in which.

DESCRIPTION OF EXAMPLE EMBODIMENTS

Figure 1:
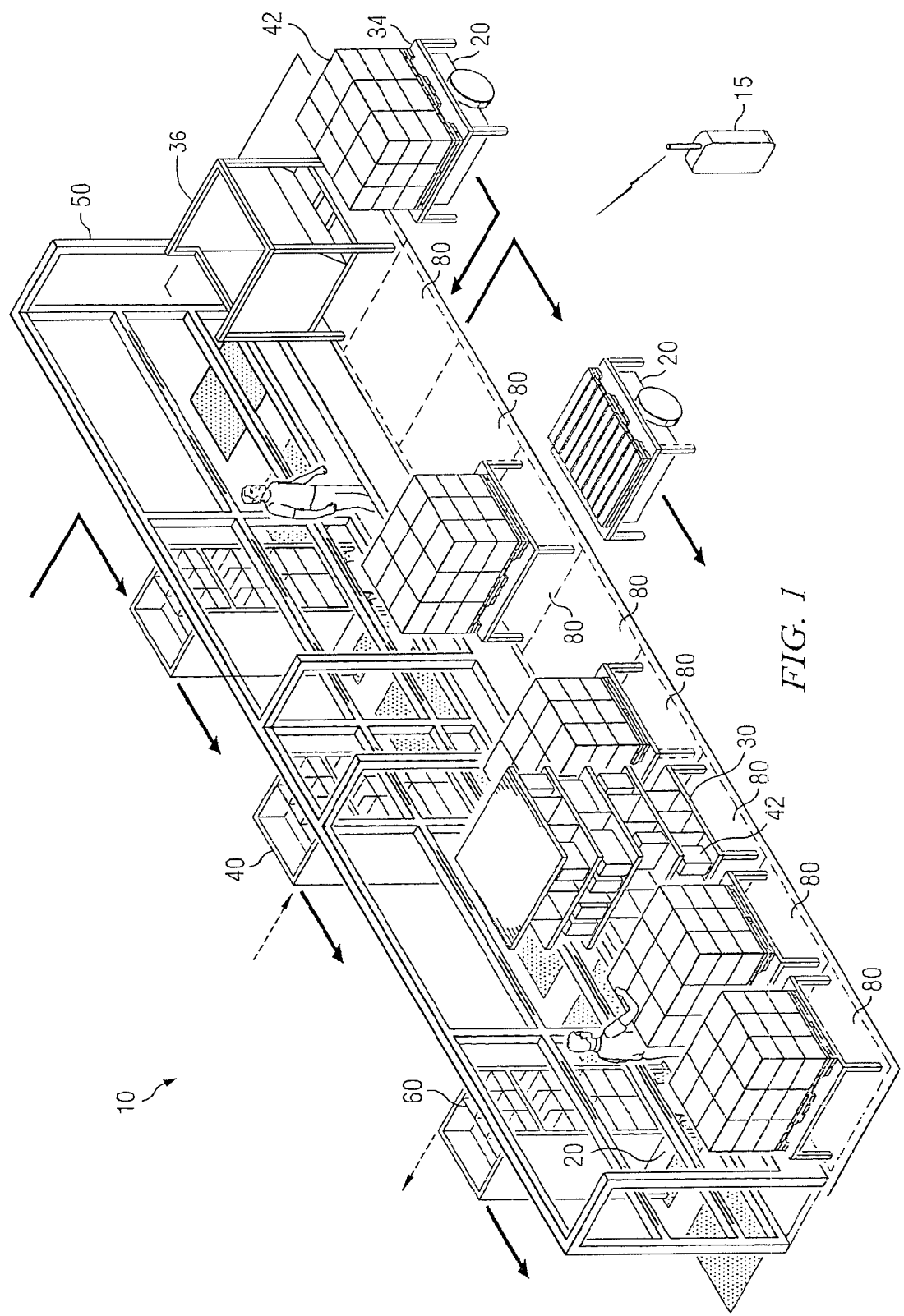
FIG. 1 is a perspective drawing that illustrates components of an inventory system that includes an inventory pier according to an example embodiment.

Inventory systems are utilized by many entities for storing and managing inventory. For example, some retailers may utilize a warehouse of racks that store inventory items in various bins. When an order for a specific inventory item needs to be filled by the retailer, a worker typically retrieves the inventory item from the bin where the inventory item is stored.

Inventory systems of the present disclosure may utilize one or more mobile drive units to automatically retrieve inventory holders from warehouse storage. The inventory holders may be entire racks of shelves, with each shelf having bins for various inventory items. Mobile drive units may be self-powered robotic devices configured to move freely about the warehouse. Racks may be transported by mobile drive units to a station for performing inventory operations. The station may include a human operator and/or automated equipment to remove desired inventory items from the inventory holders and complete orders. The ability for mobile drive units to transport inventory items to a station for performing inventory operations rather than or in addition to workers manually retrieving inventory items from stationary racks may vastly increase efficiency and productivity of the inventory system. For example, by utilizing mobile drive units, an inventory system may be capable of fulfilling more orders per hour than previous solutions. Mobile drive units may move about the warehouse and/or retrieve inventory holders in response to commands and/or instructions received from an automated guidance system. For example, a management module may control administration and coordination of certain elements and/or tasks within the warehouse. The management module may receive orders for inventory items in the warehouse and coordinate task assignments for fulfilling the orders, including providing instructions to mobile drive units to transport racks with requested inventory items to an inventory station for completion of an order. The management module may also provide guidance at the inventory station for how the order is to be assembled.

To use a simple illustration, in a distribution warehouse for an office supply store, the management module may receive an order for a printer, several ink cartridges, and a box of paper. The management module may determine the locations of these items within the racks of storage in the distribution warehouse. The items may, for instance, be on the shelves of three separate racks. The management module may issue tasks for three different mobile drive units to retrieve each rack respectively holding the printer, ink cartridges, and paper, and for the mobile drive units to transport the racks holding those items to an inventory station where the order for the three items may be packed into a box for shipment. In doing so, the management module may coordinate the various tasks such that all of the orders received by the management module are fulfilled in an efficient manner.

In many inventory systems, a small percentage of high velocity and/or high volume inventory is responsible for a large percentage of overall system activity. High velocity inventory may refer to popular inventory that is requested by a large percentage of orders, while high volume inventory may refer to inventory that is requested in large volumes by orders. Volume may refer to the physical amount of cubic space certain inventory items require in the warehouse. High volume inventory items may refer to large or bulky items and/or items that are purchased in large quantities by individual orders. In a particular inventory system, the top 1% of inventory items may account for over 20% of overall system activity. Highly popular items may require a correspondingly high use of mobile drive units to transport inventory holders to inventory stations. Similarly, high volume inventory may require relatively more labor to replenish inventory holders storing such items such that breaking down such items into inventory holders may be less efficient than merely using the inventory for orders in the manner it arrives from a wholesaler. A more efficient method of filling orders for such items may be realized using an inventory pier. The inventory pier may store highly popular and/or high volume inventory. Inventory holders that store popular or high volume inventory may be positioned along one side of the inventory pier. The inventory pier may accordingly be configured to include a configurable number of fixed positions for top inventory items. For an example inventory system storing 3,000 unique inventory items, as few as thirty unique inventory items may account for a high percentage of system activity due to high velocity or high volume of such items. Thus, in such an inventory system, the inventory pier may include a sufficient amount of defined areas to store the 30 top inventory items at the inventory pier. Order holders may, for example, be racks of shelving that are configured to hold boxes or containers that will be used to fill orders for inventory items. Each box or container may be associated with a particular order. For instance, an order holder may store a cardboard box that is to be used for shipping an order for several ink cartridges and several reams of paper. Order holders with orders needing such items may visit positions along the inventory pier corresponding to inventory holders storing inventory items needed by the orders. Operators may remove items from the inventory holders and place them into appropriate boxes or containers in the order holder. If necessary, the order holder may then be taken to an inventory station to fill items remaining on the orders in the boxes or containers of the order holder.

To illustrate, in the office supply example discussed above, paper may be a high volume inventory item and ink cartridges may be a highly popular item. Accordingly, a pallet of paper and an inventory holder storing various ink cartridges may be stationed at the inventory pier. An order for several packages of paper and an ink cartridge may be filled by moving an order holder a location along the inventory pier opposite to the pallet storing the paper where an operator may transfer the paper to the order holder. The order holder may then move to a location opposite the inventory holder storing the ink cartridges where the same or a different operator may transfer the ink cartridge to the order holder. If the requested printer is not already stored at the inventory pier, a mobile drive unit may transport the order holder to an inventory station, where another mobile drive unit may transport an inventory holder containing the printer so that the order can be filled.

Technical advantages of certain embodiments of the present disclosure include the ability to provide a system and method for fulfilling an order using an inventory pier. A technical advantage may include the ability to station high volume and/or high velocity items at the inventory pier. As demand for inventory items changes within the inventory system, a management module may include the ability to replace inventory at the inventory pier, thus ensuring that the highest velocity and/or volume items are available at the inventory pier over time. Another technical advantage may include the ability to group various orders into an order holder based on items in the orders being located at the inventory pier. Accordingly, several orders may be fulfilled at substantially the same time by a single order holder transported by a single mobile drive unit. In addition, multiple order holders may move along the inventory pier at the same time and/or in parallel, allowing orders in multiple order holders to be filled at substantially the same time. Accordingly, the inventory system may be able to achieve greater operational efficiencies than would otherwise be realized using traditional techniques. An inventory system that uses an inventory pier to fulfill orders may be capable of devoting fewer mobile drive units to fulfill orders than an inventory system that used only inventory stations and/or traditional picking methods. Moreover, the drive time of mobile drive units that would otherwise be required to transport multiple inventory holders to fill orders for high velocity items may be reduced and/or devoted to other tasks within the inventory system. Further technical advantages of certain embodiments of the present invention may include providing a flexible and scalable inventory storage solution that can be easily adapted to accommodate system growth and modification. Further technical advantages of certain embodiments of the present invention may include providing a flexible and scalable inventory storage solution that can be easily adapted to accommodate system growth and modification. Other technical advantages of the present invention will be readily apparent to one skilled in the art from the following figures, descriptions, and claims.

While specific examples having particular advantages are discussed herein, various embodiments may include all, some, or none of the enumerated advantages. Embodiments of the present invention and its advantages are best understood by referring to FIGS. 1 through 9, wherein like numerals refer to like and corresponding parts of the various drawings.

FIG. 1 is a perspective drawing that illustrates components of an inventory system 10 that includes an inventory pier 50 according to an example embodiment. As illustrated, inventory system 10 also includes management module 15, various mobile drive units 20, inventory holders 30, pallet holders 34, trash holders 36, and order holders 40. As illustrated, inventory holders 30, pallet holders 34, and trash holders 36 are stationed at defined areas 80 along one side of inventory pier 50. Inventory holders 30 and pallet holders 34 hold inventory items 42 and may generally remain stationary at defined areas 80 while orders are filled by one or more operators at inventory pier 50. Mobile drive units 20, however, may at various time transport inventory holders 30 and pallet holders 34 to and from defined areas 80. For example, as illustrated, one mobile drive unit 20 may remove an empty pallet holder 34 from inventory pier 50 while another mobile drive unit 20 replaces the empty pallet holder 34 with a new pallet holder 34 holding a pallet of additional inventory items 42. To fill orders, order holders 40 are moved by mobile drive units 20 to locations along the opposite side of inventory pier 50. At various of the locations, mobile drive units 20 may slow and/or stop so that operators and/or automated equipment at inventory pier 50 may remove requested inventory items 42 from inventory holders 30 and/or pallet holders 34 and place them into containers 60 in order holders 40. In some embodiments, the operator of the inventory pier 50 may be automated equipment and/or a human worker. As illustrated, order holders 40 may start at one end of inventory pier 50 and move along the side until reaching the opposite end. In some embodiments, order holders 40 may move directly to a location along inventory pier 50 at which an inventory item 42 may be received. Order holders 40 may then move along the side of inventory pier 50 to a location at which another inventory item 42 may be received and/or may move away from inventory pier 50 after receiving inventory items 42 (as indicated, for example, by the dashed arrows in FIG. 1). After visiting inventory pier 50, order holders 40 may be transported to other appropriate locations in inventory system 10. For example, if the orders in order holder 40 are complete, order holder 40 may be transported to a shipping station.

Management module 15 receives and/or generates requests and may initiate particular operations involving mobile drive units 20, inventory holders 30, pallet holders 34, order holders 40, inventory items 42, inventory pier 50, and/or other elements of inventory system 10. Management module 15 may select components of inventory system 10 to perform various operations and communicate commands, instructions, and/or other appropriate information to the selected components to facilitate completion of these operations. Management module 15 may receive orders for various inventory items 42 and coordinate and administer various appropriate tasks to fill the orders. Management module 15 may receive orders from any appropriate system or component, and may alternatively or additionally generate tasks and assign tasks to various components of inventory system 10 using any appropriate techniques. In particular embodiments, management module 15 generates task assignments based, in part, on orders including requests for inventory items 42 that management module 15 receives from other components of inventory system 10 and/or from external components in communication with management module 15. Based on the orders, management module 15 may identify particular operations to be completed involving inventory items stored or to be stored within inventory system 10 and may represent communication of any suitable form. For example, in particular embodiments, an order may specify particular inventory items 42 that have been purchased by a customer and that are to be retrieved from inventory system 10 for shipment to the customer.

After generating one or more task assignments, management module 15 selects appropriate components to complete particular tasks and transmits task assignments to selected components to trigger completion of the relevant tasks. The relevant components then execute their assigned tasks. Each task assignment defines one or more tasks to be completed by a particular component. These tasks may relate to the retrieval, storage, replenishment, and counting of inventory items and/or the management of mobile drive units 20, inventory holders 30, pallet holders 34, order holders 40, inventory pier 50 and other components of inventory system 10. Depending on the component and the task to be completed, a particular task assignment may identify locations, components, and/or actions associated with the corresponding task and/or any other appropriate information to be used by the relevant component in completing the assigned task.

While the appropriate components of inventory system 10 complete assigned tasks, management module 15 may interact with the relevant components to ensure the efficient use of space, equipment, manpower, and other resources available to inventory system 10. For example, management module 15 may receive information from the various components of system 10 regarding their current location, state, and/or other characteristics. Based on its knowledge of the location, current state, and/or other characteristics of the various components of inventory system 10 and an awareness of tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10.

As a result, some embodiments of management module 15 may, by implementing one or more management techniques described below, enhance the efficiency of inventory system 10 and/or provide other operational benefits. For example, management module 15 may determine particular inventory holders 30 and/or pallet holders 34 to be stationed at inventory pier 50 based on determining that when placed at inventory pier 50, overall system activity may be reduced. Similarly, management module 15 may group orders into order holders 40 and assign tasks to fulfill orders at inventory pier 50 such that order fulfillment activities are optimized. A more detailed description of example operations of management module 15 is discussed below with respect to FIGS. 3-8.

Mobile drive units 20 transport inventory holders 30, pallet holders 34, and/or order holders 40 between locations within a workspace associated with inventory system 10. Mobile drive units 20 may represent any devices or components appropriate for use in inventory system 10 based on the characteristics and configuration of inventory holders 30, pallet holders 34, order holders 40 and/or other elements of inventory system 10. In a particular embodiment of inventory system 10, mobile drive units 20 represent independent, self-powered robotic devices configured to freely move about the associated workspace. In alternative embodiments, mobile drive units 20 represent elements of a tracked inventory system 10 configured to move inventory holder 30 along tracks, rails, cables, or other guidance elements traversing the associated workspace. In such embodiments, mobile drive units 20 may receive power through a connection to the guidance elements, such as a powered rail. In some embodiments, inventory system 10 may include two or more different types of mobile drive units 20 having various appropriate capabilities and specifications. Moreover, although illustrated and discussed as though mobile drive units 20 are a particular type of mobile drive unit, mobile drive units 20 may refer to various types of mobile drive units as appropriate. For example, one type of mobile drive unit 20 may be operable to transport pallet holders 34 and/or relatively large, heavy, or bulky inventory item 42. Another type of mobile drive unit 20 may be operable to transport inventory holders 30, order holders 40, and/or relatively lighter and/or more compact inventory item 42. Mobile drive units 20 may accordingly have various power trains, load capacities, and other appropriate specifications to transport particular inventory items 42 in various types of inventory holders within inventory system 10.

Mobile drive units 20 may be capable of communicating with management module 15 to receive information identifying selected inventory holders 30, transmit locations of mobile drive units 20, or exchange any other suitable information used by management module 15 or mobile drive units 20 during operation. Mobile drive units 20 may communicate with management module 15 wirelessly, using wired connections between mobile drive units 20 and management module 15, and/or in any other appropriate manner. As one example, some embodiments of mobile drive unit 20 may communicate with management module 15 and/or with one another using Wi-Fi (IEEE 802.11), Bluetooth (IEEE 802.15), Infrared Data Association standards, or any other appropriate wireless communication protocol. As another example, in a tracked inventory system 10, tracks or other guidance element upon which mobile drive units 20 move may be wired to facilitate communication between mobile drive units 20 and other components of inventory system 10.

Inventory holders 30 store inventory items 42. In some embodiments, inventory holders 30 include multiple storage bins with each storage bin capable of holding a different type of inventory item 42. Inventory holders 30 are capable of being carried, rolled, or otherwise moved by mobile drive units 20. Each inventory holder 30 may have a plurality of faces, and each bin may be accessible through specific faces of the relevant inventory holder 30. Mobile drive units 20 may be configured to rotate inventory holders 30 at appropriate times to present particular faces of inventory holders 30 and the associated bins to an operator or other components of inventory system 10. An example embodiment of an inventory holder 30 is illustrated in greater detail in FIG. 2.

Pallet holders 34 represent a type of inventory holder 30 operable to store pallets of inventory items 42. In some embodiments, pallet holders 34 are capable of being carried, rolled, or otherwise moved by mobile drive units 20. Pallet holders 34 may store containers of bulk and/or high volume inventory items 42. Accordingly, pallet holders 34 may in particular embodiments include a large quantity of inventory items 42 having a single SKU. In some embodiments, pallet holders 34 represent containers holding inventory items 42 as they are received from a wholesaler or distributor of the particular inventory items 42. Accordingly, pallet holders 34 may in some modes of operation be moved directly from a point of entry into inventory system 10 to inventory pier 50 in response to the volume and/or velocity of inventory items 42 on the particular pallet holder 34.

Trash holders 36 store trash and/or waste materials. Trash holders 36 may represent a bin, receptacle, container, or other structure configured to store the general types of waste materials generated by inventory pier 50, which may be generated at inventory pier 50 as a result of its operation. For example, shrink wrap and/or other waste materials may be removed from pallets on pallet holders 34 as the pallets are broken down. As another example, individual inventory items 42 may be removed from packaging or other disposable containers as inventory items 42 are used to fill orders. After that packaging or other disposable container is empty, it may be placed into trash holder 36 for disposal. Trash holders 36 may, in some embodiments, be configured such that they may be transported by mobile drive units 20. Trash holders 36 may interface with mobile drive units in a similar manner to inventory holders 30, as is explained in greater detail below with respect to FIG. 2. From time-to-time, management module 15 may instruct one of mobile drive units 20 to transport trash holder 36 away from inventory pier 50 to be emptied.

Order holders 40 hold groups of containers 60 in which inventory items 42 may be packaged into orders. Containers 60 may be configured to store orders for various inventory items 42. Order holders 40 may have any appropriate structure and be configured to store containers 60 in any suitable manner based on the type of containers 60 utilized in inventory system 10 or any other appropriate factors. In some embodiments, order holders 40 represent a type of inventory holder 30 configured to carry pallets and that can be moved by mobile drive units 20. Order holders 40 may include one or more platforms or shelves on which containers 60 rest. Additionally or alternatively, order holders 40 may include a plurality of bins each holding containers 60 of a different size or type. Order holders 40 and/or containers 60 may be designated for shipment to a remote location, such as a shipping destination. Containers 60 represent any appropriate form of container into or onto which inventory items 42 can be placed for storage, shipping, or other appropriate purposes. Examples of containers 60 include, but are not limited to, boxes, pallets, bins, cartons, and envelopes. In particular embodiments, containers 60 are independent of the order holders 40 in which containers 60 are stored, and as a result, containers 60 may be removed from order holders 40 for processing or transferred to other order holders 40. As one example, containers 60 may represent boxes in which or pallets on which inventory items 42 associated with a particular order may be stored for delivery, and the relevant container 60 may then be shipped to a customer associated with that order. As another example, containers 60 may represent bins or other containers in which inventory items 42 may be placed for long term storage and then moved to a shipping location and/or removed from inventory system 10. An example embodiment of a order holder 40 and containers 60 is illustrated in greater detail in FIG. 2. More detailed examples of mobile drive units 20, inventory holders 30 and order holders 40 are discussed below with respect to FIG. 2.

Inventory items 42 represent any objects suitable for storage, retrieval, and/or processing in an automated inventory system 10. For the purposes of this description, "inventory items" may represent any one or more objects of a particular type that are stored in inventory system 10. For example, a given inventory item 42 may represent a single stock-keeping unit (SKU) of a unique inventory item. Thus, inventory item 42 may refer to a particular item and/or may refer to a quantity of items having a particular SKU as appropriate. As one example, inventory system 10 may represent a retail distribution warehouse that stores bulk inventory items 42 for retail facilities, such as grocery stores and/or merchandise warehouses. As another example, inventory system 10 may represent a e-commerce warehouse facility, and inventory items 42 may represent merchandise stored in the warehouse facility. During operation, mobile drive units 20 may retrieve inventory holders 30 containing one or more inventory items 42 requested in an order to be packed for delivery to a customer. Moreover, in particular embodiments of inventory system 10, boxes containing completed orders may themselves represent inventory items.

Inventory pier 50 represents any appropriate components for processing or handling inventory items 42, such as scanners for monitoring the flow of inventory items 42 in and out of inventory system 10, communication interfaces for communicating with management module 15, and/or any other suitable components. Inventory pier 50 includes a number of defined areas 80 at which inventory holders 30 and/or pallet holders 34 may be stationed. Inventory pier 50 is arranged such that order holders 40 are operable to be moved along the opposite side from defined areas 80 of the inventory holders 30 and/or pallet holders 34. Order holders 40 moving along inventory pier 50 may receive inventory items 42 from human operators and/or automated equipment. Human operators and/or automated equipment at inventory pier 50 may be operable to remove inventory items 42 from inventory holders 30 and/or pallet holders 34 and move them to appropriate containers 60 of order holders 40. Inventory pier 50 may accordingly include appropriate display devices and/or signaling equipment to indicate to an operator which inventory item 42 to place into which container 60. In addition or alternative, inventory pier 50 may include one or more indicators that, when activated, provide an indication to an operator where a particular order holder 40 is expected to stop and/or slow along inventory pier 50 to receive a particular inventory item 42. Indicators may be any appropriate audio and/or visual signaling device, such as a display interface, light, laser, or other appropriate device capable of providing information to an operator of inventory pier 50.

Inventory pier 50 may be controlled, entirely or in part, by human operators or may be fully automated. Moreover, the human or automated operators of inventory pier 50 may be capable of performing certain tasks to inventory items 42, such as packing or counting inventory items 42, as part of the operation of inventory system 10. Inventory pier 50 may be divided into an appropriate number of work zones corresponding to each operator. The operators may work within each work zone. Work zones may be utilized by management module 15 to balance and/or coordinate assignments at inventory pier 50. For example, inventory holders 30 and/or pallet holders 34 may be assigned to the work zones based on balancing the relative velocities of inventory items 42 among the various zones. As another example, inventory holders 30 and/or pallet holders 34 may be assigned to the work zones based on randomizing velocities of inventory items 42 among the various work zones.

Inventory pier 50 may include one or more elevated and/or flat surfaces configured to facilitate operator interaction with inventory holders 30, pallet holders 34, trash holders 36, and/or order holders 40. Additionally or alternatively, inventory pier 50 may represent area of a workspace designated for one or more of the activities described herein. Accordingly, inventory pier 50 may represent a virtual area of inventory system 10 at which the activities described in the present disclosure are conducted. A virtual area defining inventory pier 50 may be virtually bounded on two or more sides that are designated for the activities described herein, including the positioning of inventory holders 30 and/or pallet holders 34 on one side and/or the movement of order holders 40 to positions along the opposite side. Management module 15 may define and/or be programmed to interact with a virtual area of a workspace designated as inventory pier 50.

Defined areas 80 may represent spaces adjacent to inventory pier 50 at which inventory holders 30, pallet holders 34, and/or trash holders 36 may be positioned while orders are filled at inventory pier 50. Defined areas 80 may have an area that corresponds to the dimensions of inventory holders 30, pallet holders 34, and/or trash holders 36. Defined areas 80 may represent fixed locations that are located along one side of inventory pier 50. Defined areas 80 may represent virtual spaces that are defined by management module 15. It should be noted that while illustrated as contiguous spaces that are substantially similar in dimension to each other, defined areas 80 may have differing dimensions and/or may be positioned in any appropriate location relative to inventory pier 50. For example, defined areas 80 may have dimensions that are different depending on the respective dimensions of inventory holders 30, pallet holders 34, and/or trash holders 36. Accordingly, in some embodiments, defined areas 80 may have different types designated for particular types of holders. In other embodiments, defined areas 80 may be dimensioned such that they are substantially interchangeable between the different types of holders that may be positioned at inventory pier 50. In some embodiments, defined areas 80 may simply represent an area along side inventory pier 50 that is reserved for placing inventory holders 30, pallet holders 34, and/or trash holders 36.

In general, orders for inventory items 42 are filled using inventory pier 50. Inventory items 42, inventory holders 30 and/or pallet holders 34 may be assigned by management module 15 to inventory pier 50 based on demand for inventory items 42. Orders for various inventory items 42 may be filled by transporting order holders 40 carrying various containers 60 for orders to inventory pier 50, where inventory items 42 for the orders may be placed into containers 60. In some embodiments, order holders 40 may receive inventory items 32 from other types of inventory stations before and/or after receiving inventory items 32 from inventory pier 50. After visiting inventory pier 50, order holders 40 may be transported to an inventory station to receive additional items and/or be transported to a shipping station for shipment to another facility or end-user, as will be explained in more detail below. A detailed example of operation of inventory system 10 will be discussed below with respect to FIGS. 3-8. In particular, techniques for facilitating order fulfillment at inventory pier 50 is discussed below with respect to FIG. 5, and additional techniques for selecting high velocity and/or high volume inventory to station at inventory pier 50 and for grouping various orders into order holders 40 are also discussed below with respect to FIGS. 6-8.

Figure 2:
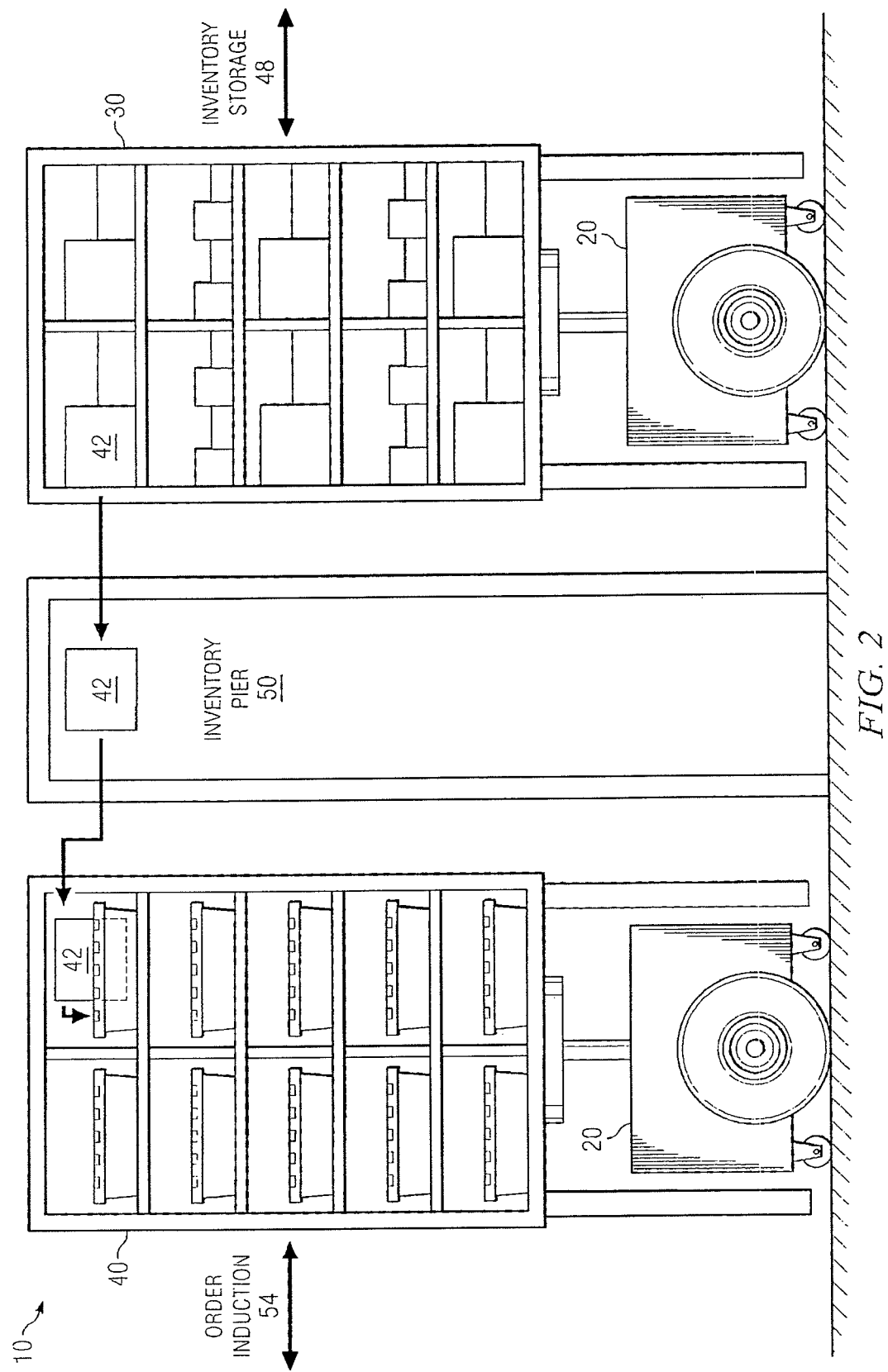
FIG. 2 illustrates a side-view illustration of various components of an inventory system capable of filling orders using an inventory pier.

FIG. 2 illustrates a side-view illustration of various components of an inventory system capable of filling orders using inventory pier 50. In particular, FIG. 2 illustrates a particular mobile drive unit 20 transporting inventory holder 30 to inventory pier 50 from inventory storage 48. Another mobile drive unit 20 transports order holder 40 containing various containers 60 for orders to inventory pier 50. As shown, order holder 40 is transported from an order induction station 54, which may be a type of station that arranges containers 60 on order holder 40. At inventory pier 50, an inventory item 42 is removed from inventory holder 30 and placed into an appropriate container 60 of order holder 40. Order holder 40 may be moved to another location along the side of inventory pier 50 to receive another inventory item 42 or may move to another appropriate location in inventory system 10.

Mobile drive units 20 may transport inventory holders 30, pallet holders 34 and/or order holders 40 by docking with and/or coupling to a particular holder and moving the holder while docked. For example, as illustrated, mobile drive units 20 respectively transport inventory holder 30 and order holder 40. For sake of simplicity, the transportation of inventory holder 30 is described in more detail, but the following description may similarly apply to some embodiments of pallet holders 34 and/or order holders 40. Mobile drive units 20 transport inventory holder 30 by moving beneath inventory holder 30 and lifting a docking head that interfaces with a portion of inventory holder 30. The docking head may be controlled by an actuator of mobile drive unit 20 operable to lift inventory holder 30 when docked. The docking head of mobile drive unit 20 may couple mobile drive unit 20 to inventory holder 30 and/or support inventory holder 30 when mobile drive unit 20 is docked to inventory holder 30. Mobile drive unit 20 may utilize the docking head to maneuver inventory holder 30, such as by lifting inventory holder 30, propelling inventory holder 30, rotating inventory holder 30, and/or moving inventory holder 30 in any other appropriate manner. The docking head of mobile drive unit 20 may also include any appropriate combination of components to facilitate such manipulation of inventory holder 30. For example, in some embodiments, a high-friction portion may form all or a portion of the docking head, which abuts a portion of inventory holder 30 while mobile drive unit 20 is docked to inventory holder 30. In such embodiments, frictional forces created between the high-friction portion of the docking head and a surface of inventory holder 30 may induce translational and rotational movement in inventory holder 30 when mobile drive unit 20 actuates docking head.

In some embodiments mobile drive unit 20 may be capable of rotating its docking head to rotate inventory holder 30 while moving and/or while stopped. In addition or in the alternative, mobile drive unit 20 may be capable of rotating the docking head independently or as a part of the movement of mobile drive unit 20 as a whole. For example, mobile drive unit 20 may rotate inventory holder 30 as mobile drive unit 20 executes a turn such that inventory holder 30 continues to face the original direction of movement. While lifted, mobile drive unit 20 may control another actuator or actuators driving power to its wheels. Using the wheel actuators, mobile drive unit 20 may be capable of transporting inventory holder 30 while the docking head is lifting inventory holder 30 or while mobile drive unit is undocked and/or uncoupled from inventory holder 30. As illustrated, mobile drive unit 20 includes a pair of stabilizer wheels in addition to the motorized wheels powered by one or more actuators.

It should be noted that while a particular method of docking with inventory holder 30 is illustrated, mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within inventory system 10. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

Figure 3:
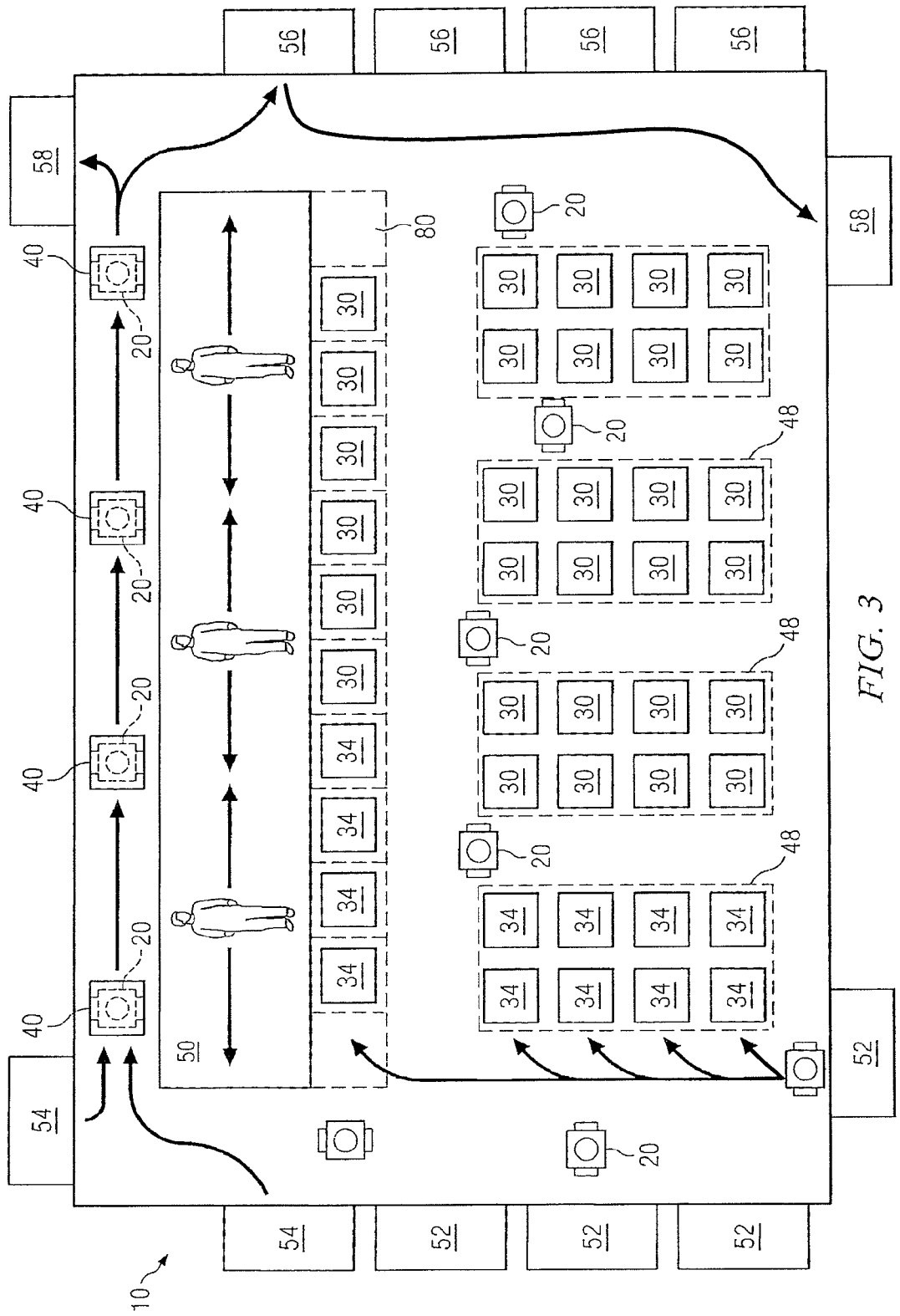
FIG. 3 illustrates an overhead view of another example embodiment of an inventory system capable of filling orders using an inventory pier.

FIG. 3 illustrates an overhead view of another example embodiment of an inventory system 10 capable of filling orders using inventory pier 50. Inventory system 10 includes various components described above with respect to FIGS. 1 and 2 arranged in a workspace. In addition to inventory pier 50, described above, inventory system 10 includes various inventory holders 30 and/or pallet holders 34 stored in inventory storage 48. Inventory system 10 also includes one or more stations, such as receiving stations 52, induction stations 54, inventory stations 56, and/or shipping stations 58. In general, orders for inventory items 42 within inventory system 10 are filled by transporting order holders 40 to inventory pier 50 and the various other stations. Inventory items 42 stationed at inventory pier 50 may be used to complete and/or contribute to orders. Additionally or alternatively, order holders 40 may be transported to inventory stations 56 to receive additional inventory items 42 in inventory holders 30, where inventory holders 30 may be transported to the inventory station 56 by mobile drive units 20 and/or have higher cubic volumes than other inventory items 42. Thus, while a quantity of high-volume inventory items 42 may be less than a quantity of relatively higher velocity items 42, the total volume of the high-volume inventory items 42 may be higher than those having higher velocities.

Inventory system 10 may represent an order fulfillment facility of any appropriate type. For example, inventory system 10 may represent an e-commerce warehouse, a distribution center for retail chain stores, a manufacturing facility, or any other facility that may employ an inventory system to manage inventory and/or fulfill orders. In many embodiments, inventory items 42 are ordered at different rates of ordering. Accordingly, some inventory items 42 are ordered with a much higher frequency than other inventory items 42. Likewise, some inventory items 42 may be ordered in much higher quantities than other inventory items 42.

Receiving stations 52, induction stations 54, inventory stations 56, and shipping stations 58 represent stations that include any appropriate components for processing or handling inventory items 42, such as scanners for monitoring the flow of inventory items 42 in and out of inventory system 10, communication interfaces for communicating with management module 15, and/or any other suitable components. Stations represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g., from pallet- or case-sized groups to individual inventory items), and/or the processing or handling of inventory items in any other suitable manner. In some embodiments, stations may just represent the physical locations where a particular task involving inventory items can be completed within inventory system 10. Alternatively or in addition, stations may represent both the physical location and also any appropriate equipment for processing or handling inventory items, such as scanners for monitoring the flow of inventory items in and out of inventory system 10, communication interfaces for communicating with management module 15, and/or any other suitable components. Stations may be controlled, entirely or in part, by human operators or may be fully automated. In some embodiments, the operator may be automated equipment. Moreover, the human or automated operators of inventory piers 50 may be capable of performing certain tasks to inventory items, such as packing or counting inventory items, as part of the operation of inventory system 10. Moreover, the human or automated operators of inventory piers 50 may be capable of performing certain tasks to inventory items 42, such as packing or counting inventory items 42, as part of the operation of inventory system 10. Receiving stations 52, induction stations 54, inventory stations 56, and shipping stations 58 represent specialized stations suitable for performing particular types of processing tasks supported by inventory system 10. Some embodiments inventory system 10, however, may include stations that are, in general, capable of handling multiple types of tasks but, at any given time, configured to handle particular types of tasks.

Receiving stations 52 represent stations at which tasks associated with receiving replenishment and/or replacement inventory items 42 take place. For example, receiving stations 52 may include a loading dock and appropriate processing equipment to intake new inventory items 42 into inventory system 10. At receiving stations 52, new inventory may be received, broken down, handled, input into inventory system 10, and/or any other appropriate tasks associated with receiving inventory items 42 into inventory system 10.

Induction stations 54 represent stations at which tasks associated with assembling and/or building order holders 40 and/or assembling containers 60 for inventory items take place. For example, induction stations 54 may include appropriate materials and equipment to assemble containers 60 and/or group containers 60 into order holders 40. Interfaces at induction stations 54 may provide any appropriate components for assembling containers 60, such as packing lists, packing materials, shipping labels, and materials related to other appropriate shipping and packaging tasks. Induction stations 54 may, in some embodiments, include appropriate devices and/or interfaces to instruct an operator of the induction station 54 how to assemble containers 60 and/or group containers 60 into order holders 40. For example, a given order may include several inventory items 42. An operator may be provided instructions with what size container 60 to use and into which order holder 40 to place container 60. Particular containers 60 may be associated with particular orders at induction stations 54. Thus, when container 60 receives an inventory item 42, the "order" may be referred to as having received the inventory item 42 as well or in the alternative.

Inventory stations 56 represent stations at which, in addition to or in the alternative to inventory pier 50, tasks related to fulfilling orders take place. At inventory stations 56, inventory items 42 may be picked and/or placed into containers 60 of order holders 40. Inventory stations 56 may include appropriate equipment to instruct an operator to remove a particular inventory item 42 from inventory holder 30 and place the inventory item 42 into container 60 of order holder 40. In some embodiments, inventory stations 56 may interface with conveyance equipment capable of transporting containers 60 to shipping stations 58 for shipment. Thus, when a particular order is complete, its associated container 60 may be removed from order holder 40 and placed onto the conveyance equipment for delivery to shipping station 58. In addition or in the alternative, mobile drive unit 20 may move order holder 40 away from inventory station 56 and transport order holder 40 to shipping station 58.

Shipping stations 58 represent locations at which orders may be shipped to a destination, such as an end-user and/or specified shipping destination for the orders. For example, shipping stations 58 may include loading docks and appropriate processing equipment to ship containers 60 from inventory system 10. In some embodiments, shipping stations 58 and receiving stations 52 may be at similar or same locations.

In operation, orders for inventory items 42 within inventory system 10 are filled using inventory pier 50. As inventory is received into inventory system 10 at receiving stations 52, pallets of inventory items 42 to replenish inventory system 10 may be placed onto pallet holders 34 and/or broken down and placed into inventory holders 30. Selected inventory holders 30 and/or pallet holders 34 may be moved by mobile drive units 20 to defined areas 80 along inventory pier 50. Inventory holders 30 and pallet holders 34 stationed at defined areas 80 may hold relatively high velocity and/or high volume inventory items 42.

As orders are received by inventory system 10, order holders 40 are assembled with appropriate containers 60 at induction stations 54. Order holders 40 are moved by mobile drive units along inventory pier 50 to receive inventory items 42 stored by inventory holders 30 and/or pallet holders 34 at defined areas 80 along inventory pier 50. If the orders on a particular order holder 40 are complete after visiting inventory pier 50, order holders 40 may be moved to shipping station 58. If the orders are not complete, order holder 40 may be moved by mobile drive units 20 to one or more inventory stations 56. As an example, an order in order holder 40 may not be complete after visiting inventory pier 50 if the order includes one or more relatively less popular and/or low volume items that are not stored at inventory pier 50. At inventory station 56, particular inventory holders 30 holding particular inventory items 42 requested by orders in order holder 40 may be transported from inventory storage 48 to inventory station 56 by mobile drive units 20. After completing the orders at pick station 56, order holder 40 may be transported to shipping station 58. It should be noted that while the illustrated example shows that mobile drive units 20 transport order holders 40 from induction stations 54 to inventory pier 50, that is not necessarily the case. In some embodiments, mobile drive units 20 may transport a given order holder 40 to one or more inventory stations 56 or other locations within system 10 before transporting order holder 40 to inventory pier 50.

Management module 15 may assign inventory holders 30 and pallet holders 34 to defined areas 80 at inventory pier 50. Management module 15 may designate particular inventory holders 30 and/or pallet holders 34 to be stationed at defined areas 80 of inventory pier 50. The designation may be based on and/or in response to the product velocities and/or volumes of inventory items 42 respectively stored in inventory holders 30 and/or pallet holders 34. In some embodiments, management module 15 may examine various orders within inventory system 10 to determine a best combination of inventory items 42 to store at inventory pier 50. A best combination may, in some embodiments, be based on determining that the highest total number of orders may be completed at inventory pier 50 with a particular inventory holder 30 and/or pallet holder 34. For example, if paper and ink cartridges are respectively the highest volume and highest velocity items 42 and are selected to be stationed at inventory pier 50, management module 15 may select a particular high selling printer to station at inventory pier 50 because many orders request a combination of paper, ink cartridges and printers. In some embodiments, the printer may be selected over another higher popularity item based on determining the printer will complete more total orders at inventory pier 50.

Management module 15 may assign inventory holders 30 and/or pallet holders 34 to defined areas 80 at inventory pier 50 according to any appropriate algorithm, logic, and/or decision-making process. For example, management module 15 may calculate the product velocities of the various inventory items 42 in inventory system 10. Management module 15 may assign inventory holders 30 and/or pallet holders 34 to defined areas 80 at inventory pier 50 in response to product velocity statistics of inventory items 42. Some inventory systems face large fluctuations in product velocity. For example, the release of a new product may spark a surge in orders for those items. As another example, holiday and/or seasonal inventory items 42 may sell at different rates depending on the time of year. Product velocity may refer to the frequency of orders requiring particular inventory items and/or types of inventory items within system 10 in a given time period. In some embodiments, product velocity may refer to the relative numbers of each inventory item and/or type of inventory item required and/or predicted to be required by orders within system 10. For example, an inventory item may have a relatively high product velocity if that inventory item is more frequently required by orders 40 within system 10 as compared to other inventory items. In some embodiments, product velocity may refer to the quantity demanded of a given inventory item in a given time period. Alternatively or in addition, product velocity may simply refer to the quantity of an inventory item 42 requested by open and/or received orders 40 within inventory system 10. In some embodiments, velocity may refer to some appropriate combination of historical velocity, known demand, and expected demand.

Product volume may refer to the relative quantities of inventory items 42 requested by particular orders. For example, particular products may be ordered in bulk quantities, such as by the case and/or by the pallet. For such inventory items 42, it may not be efficient to break down the cases and/or pallets to place them into inventory storage 48. Product volume may additionally or alternatively refer to the cubic volume of a particular inventory item 42 ordered within inventory system 10. Large and/or bulky inventory items 42 may take relatively more labor to integrate into inventory holders 30 than less sizable and/or bulky items. Thus, management module 15 may calculate product volumes for various inventory items 42 and determine to station pallet holders 34 holding such items at inventory pier 50. In some embodiments, management module 15 may determine product velocity and product volume of various inventory items 42 and determine whether to station inventory items 42 at inventory pier 50 based on product velocity and product volume statistics.

Management module 15 may accordingly calculate product velocity and/or product volume statistics for inventory items 42. Product velocity may be determined based on past order information, historical ordering trends, current orders within inventory system 10, present order information, known and/or expected demand, and/or predicted future order information, sales information, and/or any other appropriate information useful to determine known or expected demand for inventory items 42 within inventory system 10. Based on product velocity and/or product volume, management module 15 may determine inventory items 42 that have relatively high popularity and/or high volume. Inventory items 42 with high popularity may refer to items that are requested with relatively high frequency by a plurality of orders. Such inventory items 42 may generally result in management module 50 generating a correspondingly high number of task assignments to fulfill orders for such inventory items 42. Management module 15 may assign pallet holders 34 and/or inventory holders 30 based on determining that the assignment will reduce the amount of task assignments generated to fulfill orders for such items using inventory pier 50.

Management module 15 may consider various such metrics associated with demand for inventory items 42 in selecting inventory items 42 to station at inventory pier 50. For example, management module 15 may determine a number of inventory items 42 having the highest product velocities and/or product volumes to assign to inventory pier 50. As another example, management module 15 may determine a number of products with the highest known or expected demand. The number of inventory items 42 chosen may correspond to the number of defined areas 80 for inventory holders 30 and/or pallet holders 34 at inventory pier 50. In some embodiments, management module 15 may compare the velocities to a predetermined threshold to determine whether an inventory item 42 is to be stationed at inventory pier 50. For example, inventory item 42 may be required to generate at least a predetermined amount of system activity and/or task assignments to be eligible for placement at inventory pier 50. Additionally or alternatively, management module 15 may determine inventory items 42 having the highest velocities based on comparing, sorting, or otherwise analyzing the velocities of the various products to determine the ones with highest velocities.

To provide a more specific example, a particular embodiment of inventory pier 50 may include thirty defined areas 80. Management module 15 may determine an appropriate number of inventory items 42 to fill the thirty locations at inventory pier 50 with inventory holders 30 and/or pallet holders 34. For example, a pallet holder 34 may hold bulk quantities of one particular SKU of a particular inventory item 42. Meanwhile, a particular embodiment of inventory holder 30 may carry several SKUs of various inventory items 42. High velocity items 42 may be stored together in inventory holders 30 such that multiple inventory items 42 may be stored at one defined area 80 at inventory pier 50 in inventory holder 30. Returning to the office supply example discussed previously, inventory holder 30 may hold various SKUs of popular ink cartridges while a pallet holder 34 may hold boxes of high volume paper having a single SKU. As a result, while there may be, for example, thirty defined areas 80 at inventory pier 50, management module 15 may determine a higher number of inventory items 42 to store at defined areas 80. For example, management module 15 may designate 50-60 or more SKUs of inventory items 42 to be stationed at inventory pier 50.

It should be noted, however, that specific numbers herein are provided only for purposes of illustration and that any appropriate number of inventory items 42 may be stationed at inventory pier 50 depending on the configuration and arrangement of defined areas 80 at inventory pier 50, inventory holders 30 and/or pallet holders 34. For example, management module 15 may determine to store fewer inventory items 42 than there are defined areas 80, and/or may accordingly assign multiple inventory holders 30 and/or pallet holders 34 holding the same SKU or SKUs of inventory items 42. As another example, the number of defined areas 80 at inventory pier 50 may change depending on the system activity of inventory system 10. Thus, while an example number of defined areas 80 has been discussed any appropriate number of defined areas 80 may be used. Additionally or alternatively, inventory pier 50 may in some embodiments have a configurable number of defined areas 80 depending on the number of highly popular and/or high volume inventory items 42 that are above a minimum threshold within inventory system 10 at a particular time. It should also be noted that management module 15 may be operable to group high velocity items into inventory holders 30 at receiving stations 52 at the time inventory items are received into inventory system 10. Management module 15 may provide instructions to receiving stations 52 to place particular inventory items 42 into inventory holder 30. Thus, inventory holders 30 may be preconfigured to include high velocity inventory items 42 so that they may be placed at appropriate times at inventory pier 50.

Based on selected inventory items 42, management module 15 may select inventory holder 30 and/or pallet holder 34 holding the selected inventory items 42. Management module 15 may then generate and/or issue task assignments for mobile drive unit 20 to transport that holder to defined area 80 at inventory pier 50. In an example embodiment where inventory system 10 stores 5,000 SKUs of unique inventory items 42 and inventory pier 50 is arranged with thirty defined areas 80, management module 15 may select a combination of up to thirty inventory holders 30 and/or pallet holders 34 to station at inventory pier 50. Management module 15 may, in some embodiments, select an inventory holder 30 storing a best combination of inventory items 42 to station at inventory pier 50. Additionally or alternatively, the selection of inventory holder 30 may be based on determining to complete a high number of lines of orders at inventory pier 50. A "line" of an order may refer to an individual line item in that order. A line may refer to a particular SKU on the order. For example, an order for three different SKUs may have three lines. Management module 15 may determine a total number of lines on orders expected to be completed by a particular inventory holder 30 and/or pallet holder 34 when making a selection of an inventory holder 30 and/or pallet holder 34 to assign to inventory pier 50. Based on a total number of lines completed, management module 15 may assign a score to a particular inventory holder 30 and/or pallet holder 34. Management module 15 may thus assign scores to various inventory holders within inventory system 10 and/or may determine a highest relative score of each of the inventory holders 30 and/or pallet holders 34. Based on the inventory holder 30 and/or pallet holder 34 with the best score, management module 15 may select that inventory holder 30 or pallet holder 34. Management module 15 may additionally or alternatively consider similar factors when determining how and what combinations of inventory items 42 to place into inventory holders 30 when replenishing inventory holders 30 at receiving stations 52. It should be noted that while total lines completed are considered by management module 15 in example embodiments, management module 15 may additionally or alternatively select particular inventory holders 30 and/or pallet holders 34 based on total number of orders completed.

Management module 15 may thus take into account product velocity and/or total orders completed when selecting an inventory holder 30 and/or pallet holder 34 for inventory pier 50. For example, based on examining known demand and historical ordering trends for inventory items 42, management module 15 may select a combination of inventory items 42 calculated to fulfill and/or complete the most orders at inventory pier 50. In an example, the five top-selling items in an inventory system 10 may respectively be paper, ink cartridges, pencils, paper, and printers. Based on determining that the most commonly ordered combination of the above products is ink cartridges, paper, and printers, management module 15 may thus select paper, ink and printers to store at inventory pier 50.

Management module 15 may, in some embodiments, schedule particular inventory holders 30 and/or pallet holders 34 for placement at inventory pier 50. Management module 15 may plan a schedule for transporting inventory holders 30 and/or pallet holders 34 to inventory pier 50 based on metrics associated with inventory items 42. For example, management module 15 may determine expected demand for inventory items 42. Based on expected demand, management module 15 may determine that a particular inventory holder 30 should replace another inventory holder 30 at inventory pier 50 at some time in the future when the expected demand of inventory items 42 of the other inventory holder is expected to be higher than inventory items 42 in the inventory holder 30 currently at inventory pier 50. Accordingly, management module 15 may build a schedule on which various inventory holders 30 and/or pallet holders 34 will be available at inventory pier 50. Management module 15 may also determine to fulfill certain orders in the future and or delay filling orders so that inventory items 42 on various orders can be grouped together. Thus, a greater number of those items 42 will be requested at the time in the future and an inventory holder 30 and/or pallet holder 34 holding those items may be moved to the inventory pier 50 at that time. Management module 15 may also determine how and/or when to fill orders at inventory pier 50 based on a determination of when various inventory holders 30 and/or pallet holders 34 are scheduled to be transported to inventory pier 50.

Management module 15 may, in some embodiments, select particular defined areas 80 at inventory pier 50 to place particular inventory holders 30 or pallet holders 34. For example, management module 15 may select particular defined areas 80 based on an expected work allocation at inventory pier 50. For example, inventory pier 50 may include various operators that each remove items 42 from within a respective work zone in inventory pier 50. Based on an expected or actual workload of an inventory pier 50 work zone, management module 15 may allocate inventory holders 30 and/or pallet holders 34 to those particular zones. Any appropriate metric for workload may be used, such as number of picks per hour or picks per minute or other appropriate metric operable to measure activity levels at inventory pier 50. Management module 15 may balance a work allocation across the various work zones of inventory pier 50. In other embodiments, management module 15 may randomly assign inventory holders 30 and/or pallet holders 34 with various velocity inventory items 42 across the work zones. In some embodiments, management module 15 may assign pallet holders 34 to a particular subset of defined areas 80 while assigning inventory holders 30 to another subset of defined areas 80. For example, pallet holders 34 may be grouped and/or placed together at inventory pier 50. Pallet holders 34, may for example, be grouped into a particular work zone. As another example, inventory holders 30 may be grouped and/or placed together at inventory pier 50, which may be in a different work zone than pallet holders 34.

Management module 15 may determine an optimal allocation of order holders 30 and/or pallet holders 34 to the various defined areas 80 of inventory pier 50 based on the relative velocities of inventory items within the respective inventory holder 30 or pallet holder 34. It should also be noted that inventory pier 50 may have a configurable number of work zones depending on a total work amount that is expected to be completed at inventory pier 50 at particular durations of time. For example, during particularly heavy periods of work, ordering, and/or system activity level of inventory system 10, more operators may be assigned to inventory pier 50. Accordingly, inventory management module 15 may balance work allocations and/or set rates at which orders are to be filled at inventory pier 50 based on a number of operators at inventory pier 50. Management module 15 may accordingly assign more work and/or higher velocity items based on the number of operators. As is discussed in more detail below, the number of operators may also affect the number and/or type of order holders 40 being transported to inventory pier 50 for order fulfillment. Taking into account activity levels of inventory pier 50 may assure that operators at inventory pier 50 are not overworked and/or given more tasks to complete than physically possible. Management module 15 may also be able to assign appropriate amounts of work to inventory pier 50. In addition, distributing inventory holders 30 and/or pallet holders 34 to various defined areas 80 based on product velocity may allow for a more orderly and/or balanced flow of order holders 40 as they move along inventory pier 50.

From time to time within inventory system 10, demand for inventory items 42 may change. For example, inventory items may gradually lose popularity and/or be replaced with other inventory items 42 as new products and versions of products are released. For example, new movies released on DVD may initially be highly popular but may decrease in popularity over time and/or as new DVDs are released. Thus, management module 15 may be capable of tracking product velocities and/or product of inventory items 42 over time. For example, management module 15 may track known demand and/or expected demand for inventory items 42. As demand for inventory items 42 changes, management module 15 may issue appropriate task assignments to replace inventory items 42 stored at inventory pier 50 with other inventory items 42 based on the changes. For example, management module 15 may determine that an inventory item 42 stored at inventory pier 50 has decreased in popularity below another inventory item 42 currently stored in inventory storage 48. Management module 15 may issue appropriate tasks to remove that inventory item 42 from inventory pier 50 and replace it with the one currently in inventory storage 48. In addition, as inventory pier 50 uses inventory items 42 from the various inventory holders 30 and/or pallet holders 34, inventory items stored in those respective holders may decrease. Accordingly, management module 15 may detect, determine and/or receive some indication that an amount inventory items 42 in a given inventory holder 30 and/or pallet holder 34 has fallen below a predetermined amount. The predetermined amount may, for example, indicate that the inventory holder 30 and/or pallet holder 34 is running low on quantities of inventory items 42 and/or has run out of inventory items 42. Management module 15 may accordingly issue task assignments to transport replacement inventory items 42 to inventory pier 50. Management module 15 may replace depleted inventory holders 30 and/or pallet holders 34 with holders storing inventory items 42 of the same type and/or may replace depleted holders with different inventory items 42 that have relatively higher velocities, than the depleted inventory items 42.

In some embodiments, the inventory holders 30 and/or pallet holders 34 may be depleted at a faster rate on the side facing the inventory pier 50. For example, a pallet holder 34 may be depleted first of the inventory items 42 within reach of an operator of inventory pier 50. Thus, the side of a pallet holder 34 closest to inventory pier 50 may be depleted, while a side facing away from inventory pier 50 may still include an acceptable amount of inventory items 42. Accordingly, management module 15 may receive a status indication that inventory holders 30 and/or pallet holders 34 at inventory pier 50 should be rotated. Management module 15 may accordingly issue appropriate task assignments for mobile drive units 20 to rotate an appropriate inventory holder 30 or pallet holder 34. More details on the particular operation and techniques for accomplishing this will be discussed below with respect to FIG. 5.

After selecting inventory holders 30 and/or pallet holders 34 to be stationed at fixed stations at inventory pier 50, management module 15 may, in particular embodiments, assign tasks for particular mobile drive units 20 to transport the selected inventory holders 30 and/or pallet holders 34 to defined areas 80 along inventory pier 50. For example, management module 15 may communicate task assignments to selected mobile drive units 20 that identify the locations of the selected inventory holders 30 and/or pallet holders 34. Management module 15 may select a mobile drive unit 20 to assign the relevant task based on the location or state of the selected mobile drive unit 20 relative to a particular inventory holder 30 and/or pallet holder 34, an indication that the selected mobile drive unit 20 has completed a previously-assigned task, a predetermined schedule, and/or any other suitable consideration. Management module 15 may plan paths mobile drive units 20 take from the current location of mobile drive units to the selected inventory holders 30 and/or pallet holders 34. In response to being assigned a task, mobile drive units 20 may request a path to the destination of the particular inventory holder 30 or pallet holder 34. Management module 15 may select a path between the current location of the requesting mobile drive unit 20 and the requested destination and communicate information identifying the path to the mobile drive unit 20. Management module 15 may utilize knowledge of current congestion, historical traffic trends, task prioritization, and/or other appropriate considerations to select an optimal path for the requesting mobile drive unit 20 to take in getting to the destination. Additionally, in planning the path (or in assigning tasks), management module 15 may make informed decisions regarding the use of lifts, conveyors, ramps, tunnels, and/or other conveyance equipment or features of inventory system 10 to facilitate the movement of the relevant mobile drive unit 20 within inventory system 10.

After receiving a path from management module 15, the requesting mobile drive unit 20 may then move to the destination of a selected inventory holder 30 and/or pallet holder 34, traversing the path in a segment-by-segment manner. Before beginning a particular segment, the relevant mobile drive unit 20 may request permission to use the segment from management module 15. As a result, management module 15 may reserve the segment for use of that mobile drive unit 20. As a result, management module 15 may also be responsible for resolving competing requests to the use of a particular portion of inventory system 10. After reaching the inventory holder 30 and/or pallet holder 34, mobile drive unit 20 may couple, dock, or otherwise connect to the holder. For example, mobile drive unit 20 may move beneath the relevant holder and lift the holder using the docking head of the mobile drive unit. When moving beneath the holder, mobile drive unit 20 may align itself with a portion of the holder such that the center vertical axis of the docking head and/or mobile drive unit 20 is substantially aligned with the center vertical axis of the holder. After coupling, docking, and/or connecting to the holder, mobile drive unit 20 may transport the particular holder to the selected defined area 80. At the selected defined area, mobile drive unit 20 may undock, lower, uncouple, or otherwise disconnect from inventory holder 30. Mobile drive unit 20 may then move away from inventory holder 30 and/or indicate its availability to management module 15 to receive another task assignment.

According to the above principles, each of the selected inventory holders 30 and/or pallet holders 34 may be transported to inventory pier 50 by mobile drive units 20. It should be noted, however, that while a specific example of how inventory holders 30 and pallet holders 34 are transported to inventory pier 50, any appropriate method may be used. For example, in some embodiments, inventory holders 30 may be transported to inventory pier 50 by mobile drive units 20, while pallet holders 34 may be transported by some other transportation means, such as by crane, forklift, conveyor, or other industrial moving equipment capable of transporting pallets of inventory item 42. In some embodiments, management module 15 may be capable of utilizing one or more drift locations in conjunction with transporting inventory holders 30 and/or pallet holder 34 to inventory pier 50. A more detailed discussion of drift locations and how they may be used to fulfill orders at inventory pier 50 is discussed below with respect to FIG. 5.

During the operation of inventory system 10, management module 15 may at various times receive orders that request various inventory items 42. To fulfill orders for inventory items 42 received by management module 15, management module 15 may arrange two or more orders onto order holder 40. Order holders 40 may, for example, be arranged at induction stations 54. At induction stations 54, one or more orders may be grouped into containers 60 and arranged on order holders 40. Containers 60 may be arranged on to order holders 40 based on any number and types of factors including the size of containers 60, the types of inventory items 42 expected to be received in the containers 60, the ability to receive inventory items 42 for the orders from inventory pier 50, or other various appropriate factors. In addition or the alternative, management module 15 may determine to group various orders based on the expected completion of orders within a given inventory holder 34 at inventory pier 50.

Management module 15 may determine to group orders associated with containers 60 into order holders 40 in any appropriate manner. For example, management module 15 may examine outstanding orders within inventory system 10 to identify one or more inventory items 42 responsive to orders for one or more inventory items. Management module 15 may determine which inventory holders 30 and/or pallet holders 34 store those inventory items 42. Management module 15 may determine whether inventory items 42 on the orders are stored at inventory pier 50 and/or in inventory storage 48. Management module 15 may group orders based on determining that one or more inventory items 42 requested by different orders are each located at defined areas 80 at inventory pier 50. The orders may have associated containers 60 to receive inventory items 42 on the order. For example, containers 60 may be appropriately sized cardboard boxes or other containers suitable for shipping, as discussed above. Accordingly, an order holder 40 may be arranged such that it holds various groups of containers 60 associated with orders that are designated to receive inventory items 42 at various locations along inventory pier 50.

Management module 15 may be capable of arranging various configurations of order holders 40 depending on outstanding orders and/or various activity levels of inventory system 10. For example, management module 15 may arrange order holder 40 such that it includes orders for inventory items 42 that are all located at inventory pier 50. When such order holders 40 are transported to inventory pier 50 to receive inventory items 42 on the orders in order holder 40, all of the orders in that order holder 40 may be completed at inventory pier 50. Management module 15 may also arrange order holder 40 such that it includes orders for inventory items 42 that are located at inventory pier 50 and inventory items 42 that are stored in inventory storage 48. Such order holders 40 may be partially completed at inventory pier 50 and may be transported to various inventory stations 56 so that inventory items 42 in inventory storage 48 may be transported to those inventory stations 56 by mobile drive units 20. Management module 15 may also arrange order holder 40 such that it includes orders for inventory items 42 located solely within inventory storage 48. Such order holders may be completed at inventory stations 56. These configurations of order holders 40 may respectively be referred to as inventory pier-only order holders 40, mixed order holders 40, and/or inventory station-only order holders 40.

Management module 15 may determine what number and/or configuration of order holders 40 to assemble based on any appropriate considerations. For example, management module 15 may take into account activity levels and/or work allocation of operators of inventory pier 50 and/or an overall workload of inventory pier 50. If management module 15 determines that a workload of inventory pier 50 is above a predetermined level, management module 15 may determine to build mixed order holders 40 and/or inventory station-only order holders 40. The workload may refer to a number of picks per hour that are assigned, amount of work assigned, or other appropriate metric for measuring activity levels of inventory pier 50. For example, operators of inventory pier 50 may be capable of operating inventory pier 50 at up to a predetermined and/or maximum work rate. Management module 15 may assign a workload to inventory pier 50 that is calculated so that operators of inventory pier 50 operate at substantially the predetermined and/or maximum work rate. In some embodiments, the maximum work rate may be used to determine an optimal and/or maximum workload that may be assigned to inventory pier 50. Management module 15 may determine to decrease and/or increase work at inventory pier 50 to achieve an optimal and/or maximum workload. Based on that determination, management module 15 may select the number and configuration of order holders 40. If, for instance, a workload at inventory pier 50 is above a minimum but below a maximum, management module 15 may determine to arrange a mixture of mixed order holders 40 and/or inventory pier-only order holders 40 based on a predetermined schedule. The predetermined schedule may be determined based on attempting to balance work, keep the workload above the minimum and below the maximum, the number of operators at inventory pier 50, and/or any other appropriate factors. If the workload at inventory pier 50 is below a minimum, management module 15 may determine to assemble order holders 40 consisting solely of inventory pier-only order holders 40 if possible, while arranging order holders 40 for inventory items 42 located in inventory storage 48 in separate order holders 40.

Management module 15 may prioritize arrangement of orders and/or order holders 40 according to the above principles. For example, management module 15 may prioritize orders that are capable of being fulfilled at inventory pier 50 over orders that consist of relatively more rare or less popular items that may be located in inventory storage 48. Alternatively or in the addition, a separate induction station 54 may be designated for handling orders for less popular inventory items 42. Management module 15 may direct order holders 40 to be assembled at other induction stations for such other items. In some embodiments, management module 15 may arrange order holders 40 that include inventory items 42 that are stored by inventory pier 50 but may nevertheless decide to fulfill those orders from inventory stations 56 rather than at inventory pier 50 based on various factors, such as the activity level considerations discussed above.

Management module 15 may additionally or alternatively take into account where particular inventory items 42 requested by various orders are stored at inventory pier 50 when arranging an order holder 40. For example, management module 15 may attempt to balance a workload allocation across the various work zones of inventory pier 50. Management module 15 may attempt to evenly distribute the number of inventory items 42 received by a particular order holder 40 as it moves along various locations at inventory pier 50 and/or balance the flow of order holders 40 moving to inventory pier 50. To illustrate, rather than receive five inventory items 42 from one inventory holder 30 at one defined area 80, management module 15 may arrange orders containing five different inventory items 42 at five different defined areas 80 along inventory pier 50. In some embodiments, a SKU of a particular inventory item 42 may be stored in two different locations. Management module 15 may determine to fulfill orders in order holder 40 that request the same SKU using two different inventory holders 30 stored at inventory pier 50 to balance the flow of work at inventory pier 50 and/or prevent spikes in inventory pier 50 activity levels at particular times and/or locations on inventory pier 50. It should be understood however that this example is for illustration purposes only. Management module 15 may distribute and/or balance work at inventory pier 50 in any appropriate manner.

Management module 15 may determine any appropriate combination of containers 60 to arrange in order holder 40 in order to minimize a number of order holders 40 being transported to inventory pier 50. In some embodiments, management module 15 may determine to group orders based on reducing a total number of trips required by mobile drive units 20. As discussed above, task assignments assigned to mobile drive units 20 by management module 15 may involve traversing a particular path to a destination. When order holders 40 are transported to inventory pier 50, a mobile drive unit 20 may be required to transport order holder 40 from an induction station 54 to inventory pier 50.

Afterwards mobile drive unit 20 may transport order holder 40 to inventory stations 56 and/or shipping stations 58. Orders may be grouped into order holders 40 in order to minimize the number of trips required by mobile drive units 20 and/or reduce and/or minimize the total length of trips required by mobile drive units 20. Thus, management module 15 may attempt to minimize the overall trips required by mobile drive units 20 when arranging order holders 40.

After order holders 40 are assembled, mobile drive units 20 may transport order holders 40 to inventory pier 50 and/or other destinations within inventory system 10. Mobile drive units 20 may transport order holders 40 in response to appropriate task assignments from management module 15. Management module 15 may assign tasks to mobile drive units 20 to transport order holders 40 to inventory pier 50 using any of the aforementioned task assignments and/or path planning techniques. Mobile drive units 20 move order holder 40 along inventory pier 50. As order holder 40 moves along inventory pier 50, order holder 40 receives inventory items 42 at locations along inventory pier 50 along the side opposite to defined areas 80 where inventory items 42 are stored in inventory holders 30 and/or pallet holders 34. In some embodiments, operators of inventory pier 50 may transfer inventory items 42 from an inventory holder 30 and/or pallet holder 34 into an appropriate container 60 of order holder 40. Management module 15 may activate indicators, such as lights or other visual indicators, at inventory pier 50 in order to indicate to an operator where to expect order holders 40 to slow and/or stop at the various locations where inventory items 42 are to be received. Alternatively or in addition, management module 15 may transmit appropriate information to inventory pier 50 to instruct the operators what inventory items 42 to pick and into what container 60 to place that inventory item 42 of order holder 40.

Order holders 40 may be transported along a side of inventory pier 50 opposite defined areas 80 according to a manner that facilitates operator interaction with order holders 40. In some embodiments, order holders 40 may be transported along a side of inventory pier 50 such that the operator moves in a primary direction along with a given order holder 40 until the operator reaches the end of a particular work zone of the operator. When the given order holder 40 reaches the next work zone, the operator of the next zone may begin to place items into order holder 40 as appropriate. The operator of the first zone may then return to the far end of the zone and then continue placing inventory items 42 into new order holders 40 as they move in the primary direction along inventory pier 50. The arrival of orders holders 40 at the start of a particular work zone may be timed according to when the operator returns to the start of the work zone. A more detailed discussion of order holders 40 moving along inventory pier 50 as well as how indicators at inventory pier 50 may instruct operators on transferring inventory items 42 will be discussed below with respect to FIG. 5.

After appropriate inventory items 42 are received into containers 60 of order holders 40, mobile drive units 20 may continue moving order holders 40 to appropriate locations within inventory system 10. If the order is not complete, the order holder 40 may be transported by mobile drive units 20 to an appropriate inventory station 56 so that additional items 42 may be received. Additional inventory items 42 may be received by orders in order holders 40 while at inventory station 56. Additionally or alternatively, inventory station 56 may prepare the container 60 in order holder 40 for shipment to the end user and/or shipping destination. For example, operators may perform order finalization tasks such as adding protective packing materials to containers 60 and/or closing, taping, sealing, and/or performing other tasks in preparation for shipping containers 60. Once the order is complete, order holder 40 may be transported by mobile drive units 20 to shipping station 58 for shipment. It should be noted, however, that in some embodiments, inventory station 56 may be utilized to complete and ship orders. Additionally or alternatively, shipping station 58 may perform the order finalization tasks described above.

While order holder 40 is stationed at inventory station 56, management module 15 may locate additional inventory items 42 within inventory storage 48. Management assign tasks for mobile drive units within inventory system 10 to transport particular inventory holders 30 that are storing the remaining inventory items 42 needed by the orders of container 60 to inventory station 56. For example, any appropriate techniques may be used at inventory station 56 to facilitate the transfer of items from inventory holders 30 that are located in inventory storage 48 to container 60 of order holders 40. After order are complete at one or more inventory stations 56, order holders 40 and/or containers 60 may be moved and/or transported to shipping stations 58 for shipment to an end user and/or shipping destination. Mobile drive units 20 may transport order holders 40 to shipping stations 58 for final shipment preparation as discussed above.

Figure 4:
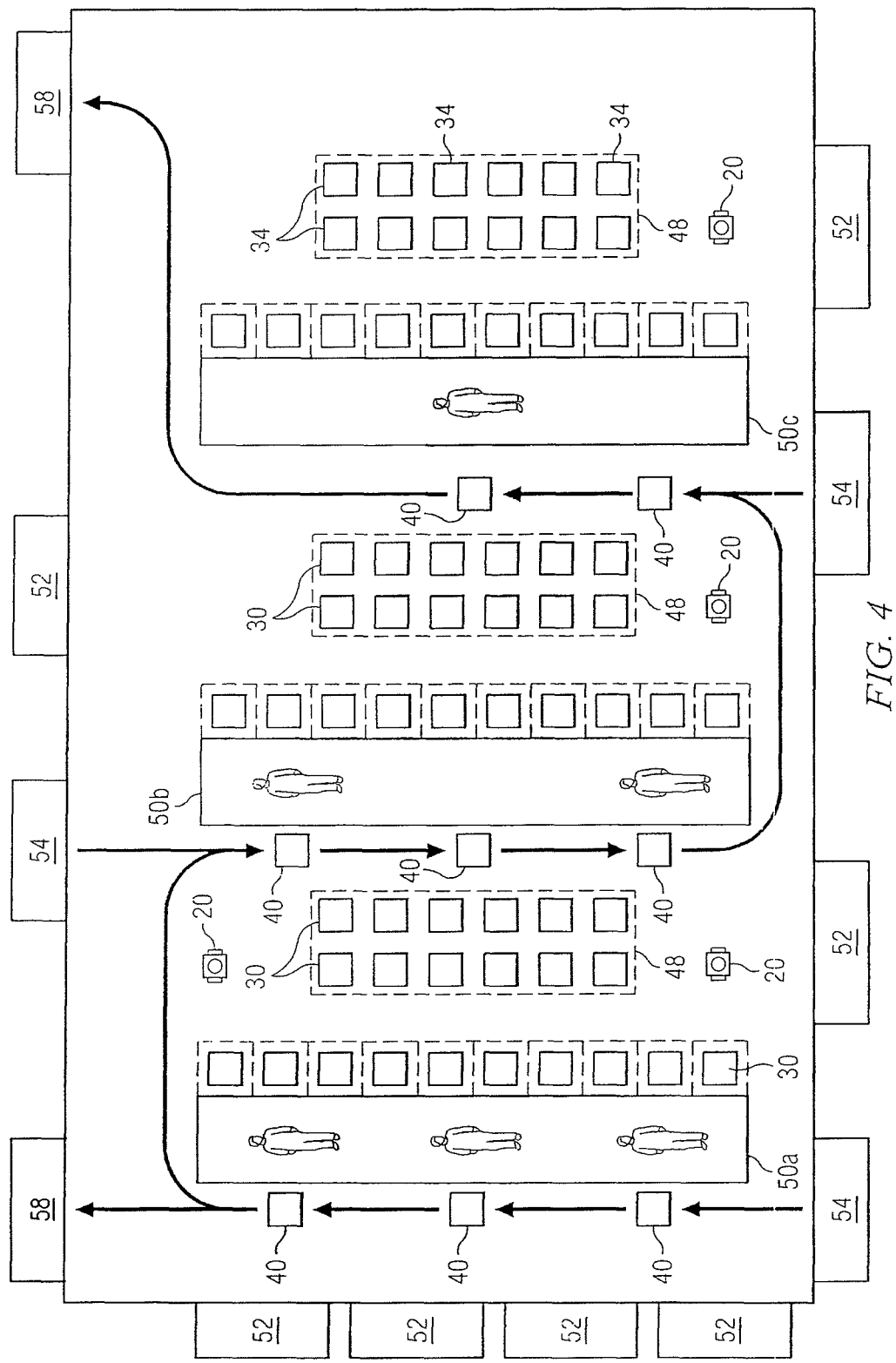
FIG. 4 illustrates an overhead view of another example embodiment of an inventory system capable of filling orders using multiple inventory piers.

FIG. 4 illustrates an overhead view of another example embodiment of an inventory system 10 capable of filling orders using inventory pier 50. In FIG. 4 inventory system 10 is arranged with multiple inventory piers 50a, 50b and 50c. When used in combination, inventory piers 50a-50c are capable of completing substantially all orders for inventory items 42 that are stored in inventory storage 48 of inventory system 10. As illustrated, inventory system 10 may operate substantially similar to the manner described above with respect to FIG. 3 with any appropriate modifications to support several inventory piers 50.

Inventory storage 48 may be arranged between the inventory piers 50 such that mobile drive units may be capable of swapping inventory holders 30 and/or pallets 34 out based on product velocity and/or volume according to the above techniques. In addition, receiving stations 52 may be arranged such that the paths traveled by order holders 40 within inventory system 10 are shortened. Thus, receiving stations 52 may be located in the vicinity of an areas of inventory storage 48 that store inventory items 32 that are received by those particular receiving stations 52. As illustrated, receiving stations 52 are positioned between inventory piers 50 such that they are accessible by mobile drive units 20 operating in the vicinity of a particular area of inventory storage 48. In addition or in the alternative, receiving stations 52 may be arranged so that operators may have a path to and from inventory piers 50 without crossing paths of mobile drive units 20. It should be noted, however, that while a particular arrangement of inventory piers 50, induction stations 54, shipping stations 58 and receiving stations 52 are illustrated, any particular geometry and layout of inventory system 10 may be appropriate and may be used. Moreover, any appropriate number and/or type of inventory piers 50 may be used.

In operation, after mobile drive unit 20 visits inventory pier 50a, mobile drive unit 20 may transport order holder 40 to inventory pier 50b if order holder 40 has orders that request inventory items 42 that are stored at inventory pier 50b. After receiving inventory items 42 from inventory pier 50b and after visiting inventory 50b, mobile drive unit 20 may transport order holder 40 to inventory pier 50c. Alternatively, if no inventory items 42 at inventory pier 50b are needed by order holder 40, mobile drive unit 20 may proceed to inventory pier 50c without visiting inventory pier 50b. In some embodiments, mobile drive unit 20 may proceed to shipping station 58 after visiting inventory pier 50a and/or 50b if the orders in order holder 40 have received all requested items and/or are ready to be finalized for shipping after visiting one or more of those inventory piers 50. Accordingly, order holder 40 may, in some embodiments, visit only the inventory piers 50a, 50b, 50c that have inventory items 42 requested by orders in order holder 40. In addition or the alternative, management module 15 may be operable to balance work allocation amongst each inventory pier 50a-50c in an inventory system 10 such that a workload over a maximum and/or below a minimum amount is avoided. For example, inventory piers 50a and 50b may each store a particular inventory item 42. Management module 15 may determine that a particular order holder 40 should receive that particular inventory item 42 from inventory pier 50b rather than inventory pier 50a based on determining that the workload at inventory pier 50b is lower than the workload at inventory pier 50a. It should be noted that a specific example of work allocation balancing is discussed for illustration purposes, management module 15 may determine to balance workloads at inventory piers 50a-50c in any appropriate manner. Management module 15 may also allocate inventory holders 30 and/or pallet holders 34 to various defined areas 80 of various inventory piers 50 according to the previously discussed balancing techniques.

Figure 5:
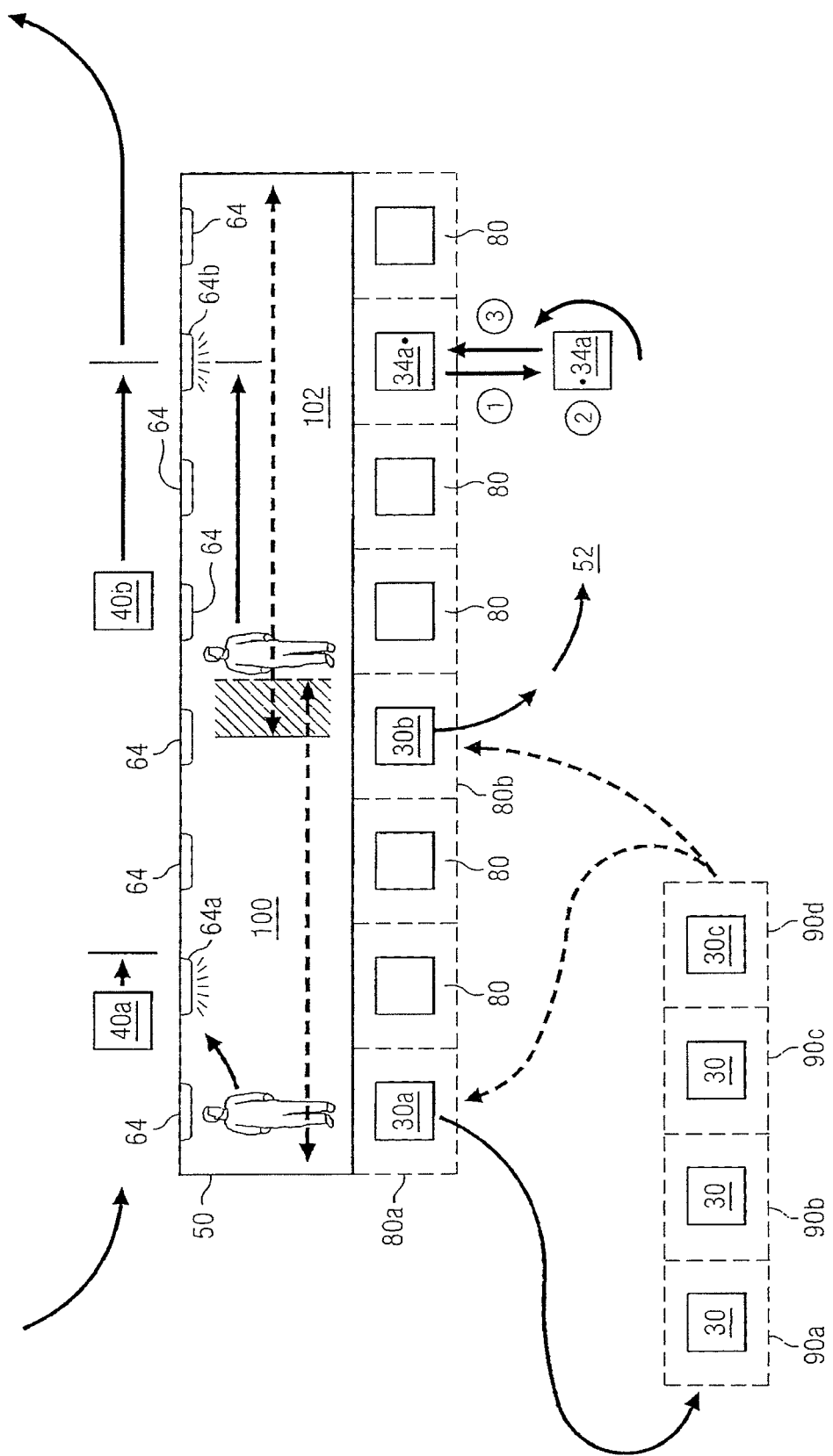
FIG. 5 illustrates particular techniques for fulfilling orders using inventory piers.

FIG. 5 illustrates particular techniques for fulfilling orders using inventory piers 50 in inventory system 10. Inventory system 10 may include one or more drift locations 90A to 90D. Management module 15 may be operable to designate particular areas within inventory system 10 as drift locations 90. Accordingly, management module 15 may use one or more drift spaces in conjunction with inventory pier 50 to facilitate fulfillment of orders. FIG. 5 also illustrates the technique of rotating inventory holders 30 that are located in defined areas 80 at inventory pier 50. Finally, FIG. 5 illustrates the ability for inventory pier 50 to activate indicators 64 in order to facilitate the movement of operators within their respective work zones. Indicators 64 may indicate that a given order holder 40 will be stopping opposite a location of an inventory holder 30 and/or pallet holder 34. Each of these techniques will be discussed in turn.

Inventory system 10 may facilitate fulfillment of orders at inventory pier 50 according to an order packing arrangement utilizing a technique herein referred to as "drifting." Drifting may allow components of inventory system 10, during the completion of a particular task involving that element, to move towards a particular destination or otherwise be positioned so as to reduce a travel time to the relevant destination. In the context of facilitating the fulfillment of orders at inventory pier 50, drifting may be used to gather inventory items 42 to the vicinity of inventory pier 50 such that they are nearby when defined areas 80 become available. The inventory items 42 that are drifting may be expected to be needed by one or more order holders 40 in the near future. Thus, the time required to swap out and/or replace inventory items 42 stationed at inventory pier 50 may be reduced over less sophisticated techniques.

"Drift" locations 90 represent locations in the vicinity of the inventory station in the warehouse designated for a mobile drive unit carrying an inventory holder to "drift" until the appropriate time to pack the inventory needed by the order. Drift locations 90 may be used as locations where popular inventory items 42 may be swapped out in and out of defined areas 80 along inventory pier 50 at particular times and/or on an as-needed basis. For example, drift locations 90 may be utilized to keep an inventory holder 30 in the vicinity of inventory pier 50 that is low on inventory items 42 and/or has recently been replaced with another inventory holder 30 storing higher velocity inventory items 42. Management module 15 may realize various efficiencies by keeping such inventory holders 30 in the vicinity of inventory pier 50, such as having them available to be placed at one of defined areas 80 when order holders 40 arrive at inventory pier 50. Accordingly, some embodiments of system 10 may utilize drifting to anticipate tasks to be completed and to position the relevant components so as to reduce the time required to complete the anticipated tasks. Drifting may reduce congestion caused by using less sophisticated techniques. Utilization of drift locations 90 may allow for fulfillment of a particular order that involves the completion of several tasks by inventory system 10 while reducing the time that inventory system 10 spends completing such tasks and improving system throughput. Drifting may additionally or alternatively allow for more efficient use of the finite physical area available within inventory system 10. An example embodiment of inventory system 10 including drift locations 90 is herein described.

Management module 15 may determine to send a particular inventory holder 30 and/or pallet holder 34 to a particular drift location 90 in response to detecting a first triggering event (or events). In particular embodiments, the relevant element may remain in the particular drift space 90 or a particular group of drift locations 90 until a second trigger event (or events) occurs. After the second trigger event occurs, the element may then move toward the relevant system resource for completion of the task. In particular embodiments, spaces may be statically designated as drift locations 90, while in alternative embodiments, spaces may be dynamically designated as drift locations 90 depending on the resource needs of inventory system 10, the availability of spaces 74, and/or other appropriate considerations. As described further below, drift locations 90 may be utilized in various ways to improve throughput or otherwise increase system efficiency of certain embodiments of inventory system 10, including but not limited to facilitating fulfillment of orders at inventory pier 50.

Management module 15 may determine to move an inventory holder 30 and/or pallet holder 34 away from inventory pier 50 in response to a first triggering event such as determining that an amount of inventory in the respective holder has fallen below a predetermined amount. In some embodiments, management module 15 may determine that inventory items 42 of a nearly depleted inventory holder 30 has also decreased in popularity beneath other inventory items 42. Drift locations 90 may thus be used to keep an inventory holder 30 with low inventory items 42 near inventory pier 50 so that it can be used as necessary to fulfill orders for those inventory items 42. As another example, a particular inventory holder 30 may include inventory item 42 that has decreased in product velocity and a more popular item is moved to defined area 80 at which inventory holder 30 was previously stationed. Rather than moving inventory holder 30 holding such inventory items 42 to inventory storage 48, for example, that inventory holder 30 may be moved to a drift location 90 so that it is available in the vicinity of inventory pier 50 for future orders. Management module 15, however, may determine that the inventory items 42 are still relatively more popular than others stored in inventory storage 48 and/or are expected to be needed by orders in the near future. Greater efficiencies may be realized by leaving such inventory holders 30 in the vicinity of inventory pier 50 rather than moving the inventory holders 30 to inventory storage 48 if those inventory holders 30 are likely to be needed in the near future.

As shown, several drift locations 90a to 90d are disposed in the vicinity of inventory pier 50. As shown, a particular inventory holder 30a may be moved to a drift location 90a in response to management module 15 detecting one of the triggering events discussed above, which may cause management module 15 to transfer inventory holder 30a from defined area 80a to drift space 90a.

As other inventory holders 30 drift, inventory holder 30a may drift at one or more of drift locations 90a to 90d. In some embodiments, drift locations 90a to 90d may serve as a random access buffer for inventory holders 30. Thus, inventory holder 30 may be assigned to a random available drift location 90a to 90d. Inventory holder 30 may remain in the assigned drift location 90a to 90d until a second triggering event occurs. Additionally or alternatively, drift locations may act as a sequential queue. Inventory holder 30 may drift through locations 90a to 90d as sequential locations become available. It should be noted, however, that while drift locations 90a to 90d are illustrated as being adjacent to each other, that need not necessarily be the case. In some embodiments, drift locations 90 may be contiguous and/or separated from each other. Moreover, in some embodiments, drift locations 90 may be located in discretely located groups of drift locations 90 as appropriate. In response to detecting a second triggering event, management module 15 may determine to move inventory holder 30a back to defined area 80 along inventory pier 50. For example, order holder 40 requiring inventory items 42 stored by inventory holder 30a may be transported to inventory pier 50 and/or be expected to be transported to inventory pier 50 in the near future. As illustrated, this technique may be utilized with several inventory holders 30a-30c as appropriate to drift various holders in the vicinity of inventory pier 50. Thus, such inventory holders 30 will be available to be stationed at defined areas 80 more quickly than would otherwise be possible using less sophisticated techniques.

As another example of a triggering event that causes management module 15 to determine to drift an inventory holder 30, it may be determined that inventory holder 30b at defined area 80b is expected to run out and/or run out of inventory items 42 in the near future, thus, inventory holder 30c may be transported to drift location 90d with the expectation that inventory holder 30c will soon replace inventory holder 30b. Inventory holder 30c may, for example, store additional inventory items 42 of the same SKUs as those stored by inventory holder 30b. As another example, it may be expected that inventory items 42 by inventory 30b are expected to fall below a certain relative product velocity and items 42 in inventory holder 30c may have a relatively higher product velocity. Inventory holder 30c may be ready in drift location 90d to replace those items in inventory holder 30b when appropriate.

Management module 15 may, in some embodiments, determine to drift one or more order holders 40. Management module 15 may determine to drift one or more order holders 40 in response to detecting a first triggering event. The first triggering event may, for example, be determining that the workload of inventory pier 50 exceeds a predetermined and/or maximum amount. For instance, all of the available locations at inventory pier 50 may be taken by other order holders 40. Management module 15 may instruct mobile drive unit 20 to transport order holder 40 to a drift location 90 proximate to inventory pier 50. In response to a second triggering event, management module 15 may instruct mobile drive unit 20 to transport order holder 40 from the drift location 90 to inventory pier 50. For example, a second triggering event may be determining that the workload of inventory pier 50 is below the predetermined and/or maximum amount. Other examples of triggering events that may trigger drifting of order holders 40 include determining that an inventory holder 30 and/or pallet holder 34 that has inventory items 42 requested by one or more orders in order holder 40 is not at inventory pier 50, but will be at inventory pier 50 in the near future. For example, the inventory holder 30 having the requested inventory item 42 may itself be in a drift location 90. As another example, pallet holder 34 may be in the process of undergoing a rotation maneuver, as is explained in more detail below. Thus, management module 15 may determine to drift order holder 40 until the desired inventory holders 30 and/or pallet holders 34 are located at inventory pier 50. Moreover, order holders 40 may be sent to drift locations after receiving inventory items 42 at inventory pier 50 if management module 15 determines that additional inventory items 42 requested by order holders 40 will be transported to inventory pier 50 in the near future. Order holders 40 may first receive all available inventory items 42 requested by orders in those order holders 40 before moving to drift locations 90. In some embodiments, however, management module 15 may determine to send an order holder 40 to a location in inventory storage 48 under some conditions. For example, order holder 40 may request inventory items 42 that are available only at inventory pier 50, but are not scheduled to be transported to inventory pier 50 until after a amount of time has lapsed that is greater than a predetermined threshold. Alternatively or in addition, management module 15 may select particular order holders 40 to transport to inventory pier 50 based on an amount of time since those order holders 40 were assembled at induction station 54.

FIG. 5 also illustrates a technique for rotating pallet holder 34a that is stationed at defined area 80 at inventory pier 50. First, management module 15 may determine to rotate pallet holder 34a in response to any appropriate triggering event. For example, an operator of inventory pier 50 may indicate that the inventory items 42 on the side closest to inventory pier 50 are low while other inventory items on the other side of pallet holder 34a are still available (but may be out of reach of the operator). Thus, management module 15 may instruct mobile drive unit 20 to move to pallet holder 34a and/or execute a rotation maneuver. Mobile drive unit 20 may move beneath pallet holder 34a. Mobile drive unit 20 may then dock, couple, or otherwise connect to pallet holder 34a. Mobile drive unit 20 may then move pallet holder 34a away from inventory pier so that pallet holder 34a may be rotated. Pallet holder 34a may be moved out by an appropriate amount such that only enough space is required to rotate pallet holder 34a without colliding with other inventory holders 30 and/or pallet holders 34 located at inventory pier 50. As illustrated at step two, pallet holder 34a may be rotated by 180 degrees. At step three, pallet holder 34a may be moved back into place at inventory pier 50. While it is illustrated as rotating 180 degrees, pallet holder 34a may be rotated by any appropriate amount including 90 degrees, 270 degrees or any other appropriate amount.

FIG. 5 also illustrates particular techniques for moving inventory holders 40 along inventory pier 50 in order to facilitate the efficiency of one or more operators of inventory pier 50. As illustrated, inventory pier 50 includes two zones 100 and 102, one for each operator. As shown, zones 100 and 102 may change and/or overlap based on the operation of inventory pier 50 and the arrival of order holders 40. Operators may be instructed to move in a primary direction to pick inventory items from inventory holders 30 and/or pallet holders 34 as order holders 40 move along inventory pier 50. The primary direction may be the same direction as the direction that order holders 40 move along inventory pier 50. In the illustration, inventory holders 40 move from left to right, and operators primarily move from left to right. Once the operator reaches the end of the zone 100 while moving in the primary direction, the operator may be instructed to return to the starting point of zone 100, which is illustrated as the furthest left point of inventory pier 50. After returning to the starting point of zone 100, the operator may begin moving in the primary direction once again to fill more requests for moving inventory items 42 into containers 60 of order holders 40. Order holder 40 may move to locations opposite to defined area 80 of a particular inventory holder 30 that holds an inventory item 42 requested by an order in order holder 40. Once order holder 40 reaches the appropriate location, order holder 40 may slow and/or stop until the operator completes the transfer of the inventory item 42 into an appropriate container 60 of order holder 40. Order holders 40 may receive inventory items 42 from the operators as the operator moves in the primary direction. A similar pattern may be used for the operators of other zones, including zone 102. In some embodiments, the arrival of order holder 40 may be timed such that order holders 40 arrive as an operator moves along zone 100 in the primary direction. Alternatively or in addition, operators of inventory pier 50 may move in both directions as appropriate to move to order holders 40 that are ready to receive inventory items 42.

As illustrated, indicators 64 are arranged at various points along inventory pier 50 opposite to defined areas 80 of inventory holders 30 and/or pallet holders 34. As order holders 40 move along inventory pier 50, indicators may be activated in order to instruct an operator where to expect inventory order holders 40 to stop or slow along inventory pier 50. Indicators 64 may generally be disposed opposite to each defined area 80. It should be noted that while illustrated as being discrete indicators 64, any appropriate method of communicating where order holder 40 will be may be used. For example, a display screen may be disposed at various locations along inventory pier 50 that instruct operator 50 where to expect an order holder 40 to stop and/or slow and additionally may instruct operator which items 42 to move from inventory holder 30 and/or pallet holder 34.

In the illustrated embodiment, order holder 40a will stop proximate to indicator 64a. Management module 15 may accordingly activate indicator 64a. The operator may proceed to indicator 64a. At indicator 64a, the operator may place appropriate inventory items 42 from inventory holder 30 opposite to indicator 64a into an appropriate container 60 of order holder 40a. In some embodiments, indicator 64a or some other piece of equipment at inventory pier 50 may instruct the operator to pick particular inventory items 42 and/or instruct the operator to place the particular inventory items 42 into particular containers 60 of order holder 40a. For example, an indicator may display a light or other visual indicator indicating which container 60 is to receive inventory items 42 from a given inventory holder 50. Similarly, in the second work zone 102 the other operator may receive a signal from indicator 64b indicating that order holder 40b will stop and/or slow proximate to indicator 64b. According to these techniques orders may be fulfilled at inventory pier 50 in a more efficient manner than would otherwise be possible.

Mobile drive units 20 may be operable to avoid collisions with other mobile drive units 20 while moving along inventory pier 50. For example, as order holder 40a moves along inventory pier 50, management module 15 may determine the next location to receive an inventory item 42. Management module 15 may determine whether another order holder 40b is blocking the path between the order holder 40a and the next location. If order holder 40b is not blocking and no others are blocking, then management module 15 may activate indicator 64a at the next location and mobile drive unit 20 may transport order holder 40a to indicator 64a. If order holder 40b is in the way, management module 15 may determine the destination of order holder 40b. If the destination of order holder 40b is past the next location of order holder 40a, then indicator 64a may be activated. Otherwise, management module 15 may delay activation of indicator 64a until order holder 40b no longer has a blocking destination along the path of order holder 40a and/or clears the intended path of order holder 40a. This method also avoids confusion for operators because the operator will know that an indicator 64 activation corresponds to the preceding order holder 40.

Figure 6:
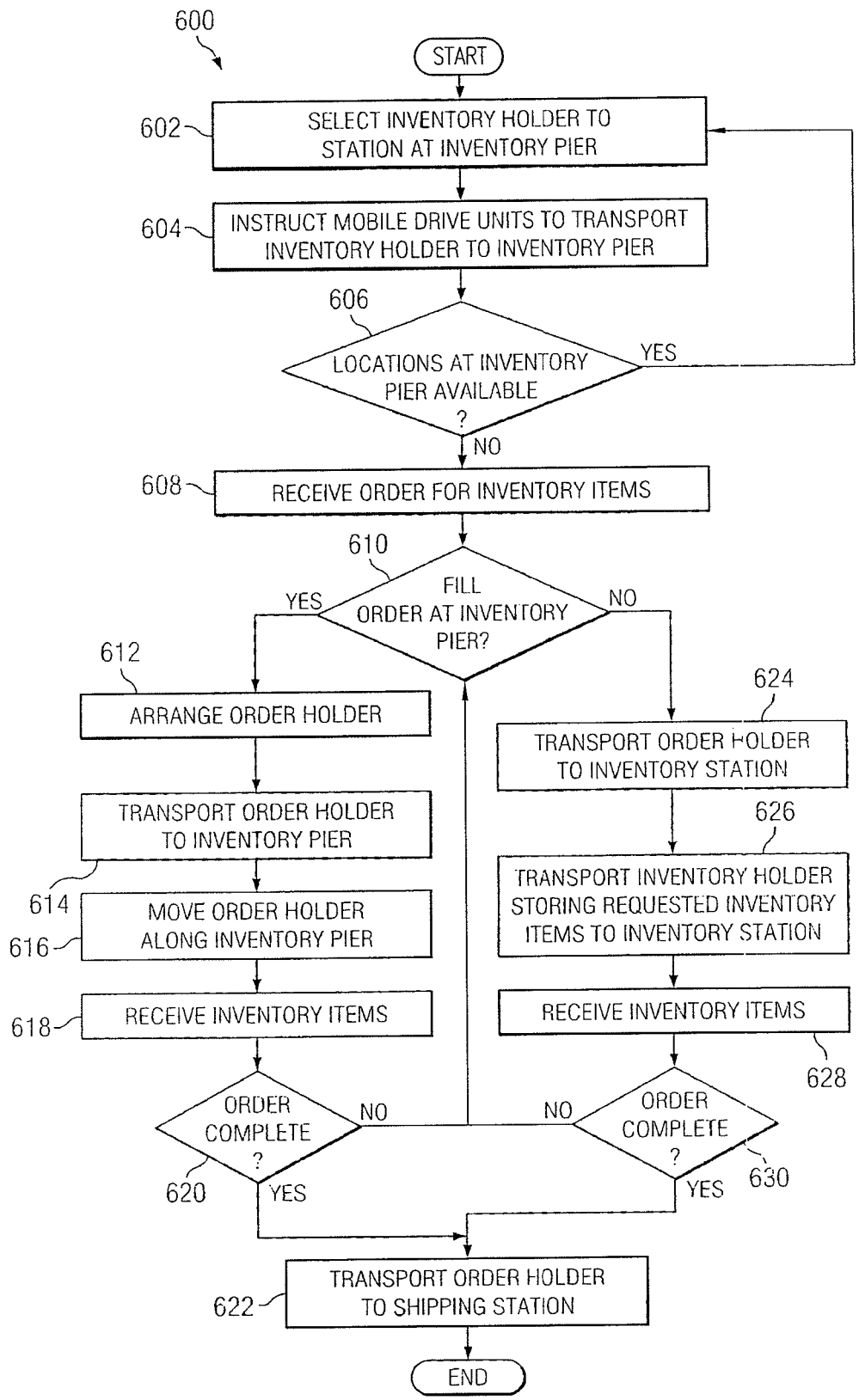
FIG. 6 is a flowchart illustrating an example method of filling an order using an inventory pier.

FIG. 6 is a flowchart illustrating an example method 600 of filling an order using inventory piers. Method 600 begins at step 602 at which management module 15 selects inventory holders 30 and/or pallet holders 34 to station at inventory pier 50. The selection may be made according to any appropriate algorithm, logic, and/or decision making process. A more detailed explanation of how step 602 may be implemented is discussed in further detail with respect to FIG. 7 below.

At 604, after appropriate inventory holders 30 and/or pallet holders 34 are selected to station at inventory pier 50, management module 15 instructs mobile drive units 20 to transport inventory holders 30 and/or pallet holders 34 to inventory pier 50. Mobile drive units 20 may retrieve the selected inventory holders 30 and/or pallet holders 34 and transport them to appropriate defined areas 80 of inventory pier 50, according to techniques discussed above.

At step 606, management module 15 may determine whether defined areas 80 at inventory pier 50 remain available. If additional defined areas 80 remain to be filled, the method may return to step 602 at which additional inventory holders 30 and/or pallet holders 24 may be selected to station at inventory pier 50. It should be noted that while illustrated as happening in succession, management module 15 may select all inventory holders for each defined area 80 at substantially the same time. Moreover, steps 602 to 606 may occur at various times and/or continuously within inventory system 10 as demand for inventory items 42 changes. Moreover, in some embodiments management module 15 may determine to leave some defined areas 80 unfilled. Management module 15 need not designate all defined areas 80 at inventory pier 50 for inventory holder 30 and pallet holders 34. For example, management module 15 may leave some defined areas unfilled due to workload constraints, overall system activity, or other various factors. Alternatively or additionally, one or more defined areas 80 may be designated as locations for a trash holder 36 or other waste receptacle. In some embodiments, the trash holder 36 and/or waste receptacle may be operable to be transported by mobile drive unit 20. Accordingly, packing material and/or or other waste products are generated by inventory pier 50 the waste materials may be placed into trash holder 36 at defined area 80. At appropriate times and/or when full, the trash holder 36 may be transported away from inventory pier 50 by mobile drive unit 20.

At step 608, management module 15 may receive orders for various inventory items 42. For example, orders may from time-to-time be received by inventory system 10. It should also be noted that orders may be received before, during, and after the process of assigning inventory holders 30 and/or pallet holders 34 to defined areas 80 described in steps 602 to 606. Thus, step 608 may occur sequentially and/or in parallel to steps 602 to 606. Moreover, orders may be received when reassigning new inventory holders 30 and/or pallet holders 34 to defined areas 80 as appropriate.

At step 610, management module 15 may determine whether to satisfy one or more requests for inventory items 42 on the order at inventory pier 50. For example, based on work allocations and/or a total work load at inventory pier 50 management module 15 may determine to fill all and/or part of the order at an inventory station 56 rather than inventory pier 50. In some embodiments, management module 15 may determine to fill part of an order at inventory station 56 and part of the order at inventory pier 50. Management module 15 may also determine a sequence of inventory stations 56 and/or inventory piers 50 for an order to visit as the order is filled. The sequence may be any appropriate sequence, including visiting one or more inventory stations 56 first or visiting one or more inventory piers 50 first. Alternatively or additionally, management module 15 may determine an appropriate type of order holder 40 to be arranged. For example, order holder 40 may be arranged as an inventory pier-only order holder 40, mixed order holder 40, and/or a inventory station-only order holder 40. The decision-making process of how to treat a given order may occur according to any of the aforementioned work balancing and/or allocation techniques. In some embodiments, management module 15 may determine where to send an order holder 40 while order holder 40 is in the process of receiving inventory items 42. For example, management module 15 may determine to fill the order and/or part of the order on order holder 40 with inventory items 42 positioned at inventory pier 50. Conversely, management module 15 may determine to fill an order and/or part of an order on order holder 40 at inventory station 56. After receiving those inventory items 42, management module 15 may determine whether to fill additional orders and/or additional lines of the order on order holder 40 inventory items 42 at inventory pier 50 and/or inventory station 56. As an example, management module 15 may determine where to send order holder 40 based on examining open lines of orders on order holder 40 for requested inventory items 42 that have not yet been received and/or determining where in inventory system 10 such inventory items 42 are located. Additionally or alternatively, management module 15 may determine to fill an order at one or more of inventory pier 50 and inventory station 56, but may decide to wait a predetermined amount of time before instructing mobile drive units 20 to transport order holder 40 to one or more of those locations. For example, based on one or more triggering events discussed above, management module 15 may determine to transport order holder 40 to a drift location before continuing to fill orders on order holders 40. As another example, management module 15 may determine to delay assembling a particular order based on one or more conditions of inventory system 10. Management module 15 may accordingly also take into account how long an order has been pending in determining whether or not to fill that order and/or to fill another order first.

At step 612, management module 15 may determine an arrangement for order holder 40 to be transported to the inventory pier 50 to fill the order. For example, management module 15 may determine to group two or more orders into a particular order holder 40 such that both orders may be completed by one order holder 40. More details on how step 612 may be completed according to an example operation of inventory system 10 are discussed below with respect to FIG. 8. After the order holder 40 is arranged, at step 614, management module 15 may instruct one or more mobile drive units to transport order holder 40 to inventory pier 50 so that items may be received into container 60 of order holder 40. It should be noted that step 612 may be performed based on the type of order holder 40 management module determines to arrange at step 610. Moreover, while illustrated as occurring if management module 15 determines to fill all and/or part of the order at inventory pier 50, step 612 may be performed even if management module 15 determines to fill the order at inventory station 56 at step 624. For example, management module 15 may determine to arrange the order into an inventory-station only order holder 40 and/or may group the order onto an order holder 40 along with other orders that are designated to be filled at inventory station 56.

At step 616, mobile drive unit 20 moves order holder 40 to locations along inventory pier 50 such that order holder 40 may receive inventory items 42 according to the orders associated with each container 60 that it holds. Containers 60 may receive inventory items 42 according to their associated orders at step 618. For example, an operator of inventory pier 50 may, at a location where order holder 40 stops and/or slows, transfer an appropriate inventory item 42 into an appropriate container 60 of order holder 40.

At step 620, after inventory items 42 are received at inventory pier 50, management module 15 may determine whether the orders in order holder 40 are complete. If the order is complete, then at step 622 management module 15 may instruct mobile drive 20 to transport the order holder 40 to inventory station 56 and/or shipping station 58 for shipment preparation and/or shipping to final destination. If one or more orders on order holder 40 are not complete, then the method may proceed to step 610, where management module 15 may determine whether to fill remaining open lines of orders on order holder 40 at inventory pier 50 and/or inventory station 56. For example, management module 15 may determine at step 610 that additional items requested by orders on order holder 40 will be available in the near future at inventory pier 50. Management module 15 may thus instruct mobile drive unit 20 to transport order holder 40 to a drift location 90 in the vicinity of inventory pier 50 and/or wait for that inventory to become available. As another example, management module 15 may determine at step 610 that open lines of orders on order holder 40 request inventory items 42 that are located in inventory storage 48.

Management module 15 may at step 624 instruct mobile drive unit 20 to transport order holder 40 to inventory station 56 so that any items that should be placed in containers 60 in order holder 40 may be received at step 628. For example, management module 15 may determine to fill lines of orders on an inventory-station only order holder 40 and/or mixed order holder 40 at inventory station 56. Step 624 may occur before, after, and/or in the alternative to mobile drive unit 20 transporting order holder 40 to inventory pier 50.

At step 626, while order holder 40 is located at inventory station 56, management module 15 may locate requested inventory items 42 that are stored in inventory holders 30 and/or pallet holders 34 in inventory storage 48. Based on the location of the stored inventory items 42 management module 15 may instruct one or more mobile drive units 20 to move to the location of inventory holders 30 and/or pallet holders 34 storing those inventory items 42 within inventory storage 48. At step 626, mobile drive units 20 may transport said inventory holders 30 and/or pallet holders 34 storing the requested inventory items 42 to inventory station 56.

At step 628, inventory items 42 stored by the inventory holders 30 transported to inventory station 56 may be received by the appropriate container 60 of order holder 40. After container 60 receives the requested inventory item 42 from inventory holder 30, management module 15 determines whether the orders are complete at step 630. If there are incomplete orders, then method 600 returns to step 610 management module 15 determines whether to fill additional lines of orders in order holder 40 at inventory pier 50 and/or inventory station 56. If it is determined to fill additional lines of orders at inventory station 56, order holder 40 may remain at inventory station 56 and additional inventory holders 30 containing additional requested inventory items 42 may be transported to inventory station 56. If it is determined to fill additional lines of orders at inventory pier 50, the method may continue to step 614, where order holder 40 may be transported to inventory pier 50. Method 600 continues until the orders in order holder 40 are complete at step 620 or 630. Once complete, order holder 40 is transported by mobile drive unit 20 to inventory station 56 and/or shipping station 58 for preparation and/or shipment to an end user and/or shipping destination.

Figure 7:
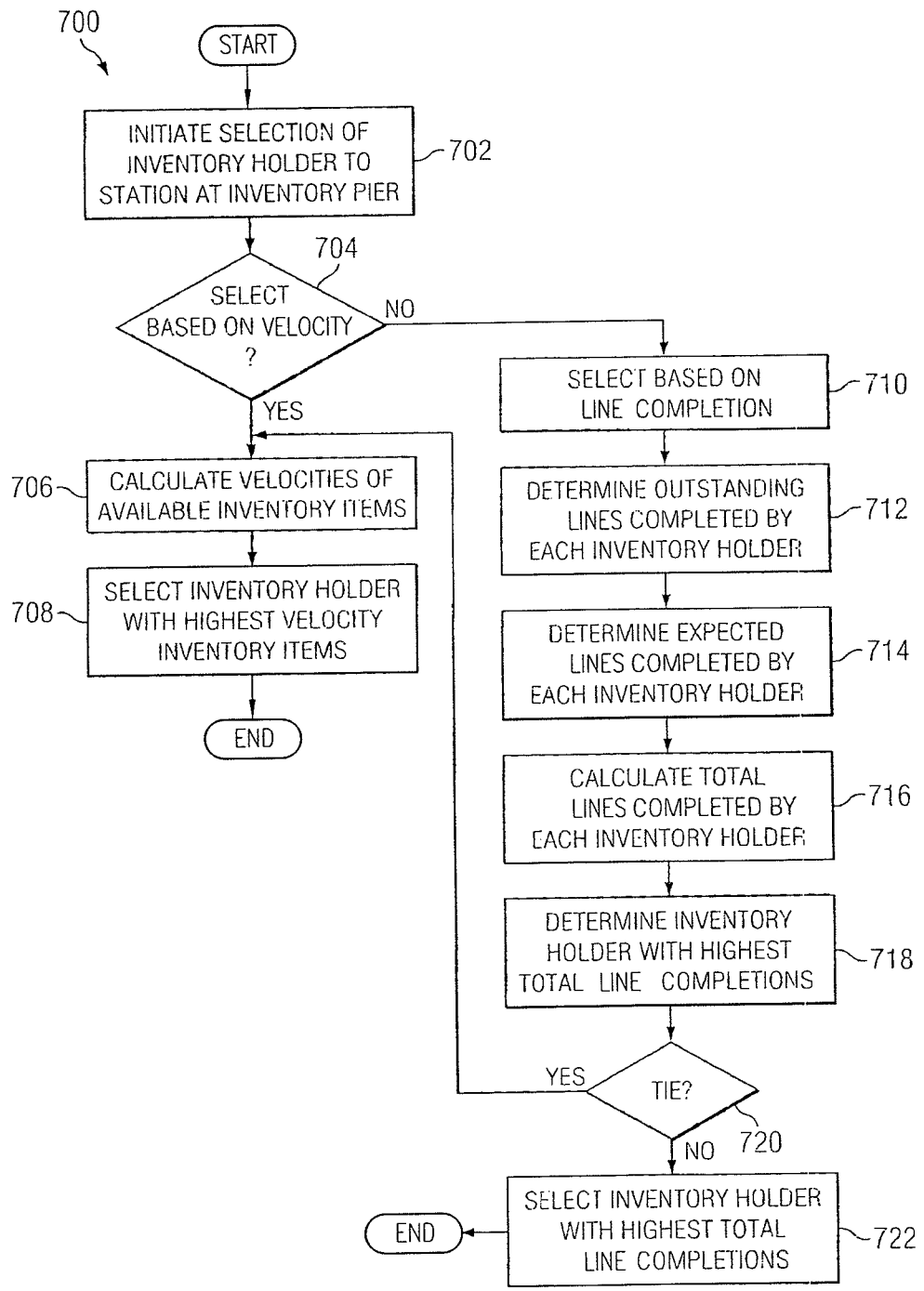
FIG. 7 is a flowchart illustrating an example method of facilitating fulfillment of an order at an inventory pier.

FIG. 7 is a flowchart illustrating an example method 700 of facilitating fulfillment of an order at an inventory pier. Method 700 begins at step 702 at which selection of inventory holder 30 to be stationed at inventory pier 50 is initiated. Method 700 is an example implementation of step 602 of method 600 in FIG. 6.

The method of selection of inventory 30 may proceed based on velocity and/or order line completion. If inventory holder 30 is selected based solely on velocity at step 704 then the method proceeds to step 706 at which the velocities and/or volumes of available inventory items 42 in inventory system 10 are calculated at step 706. Velocities of available inventory items 42 may be calculated on any appropriate metric including historical ordering trends and/or the currently outstanding orders and/or expected orders that are predicted to occur within the inventory system 10. As discussed above, velocity may represent a relative rate at which orders include each inventory item and/or may include the volume at which inventory items 42 are ordered. Volume may refer to amounts of inventory items 42 orders by particular orders, and additionally or alternatively may represent physical volume in terms of the actual size of inventory items 42. Thus, management module 15 may determine to position inventory items 42 at inventory pier 50 based on the actual amount of space those inventory items 42 take up. For example, large and/or bulky items may be selected for placement at inventory pier 50. In some embodiments, management module 15 may calculate the total system activity generated within inventory system 10 by a particular SKU and/or unique inventory item 42. Inventory holders 30 and/or pallet holders 34 may be selected based on minimizing total system activity.

At step 708, inventory holders 30 and/or pallet holders 42 storing inventory items 42 having the highest velocity are selected to be stationed at inventory pier 50. In an example embodiment, inventory pier 50 may have the top fifty inventory items 42 positioned in ten inventory holders 30 that are each located at one of ten defined areas along inventory pier 50, where each inventory holder 30 stores five of the top fifty inventory items 42. If one of the defined areas 80 becomes available, because, for example, one of the inventory holders 30 runs low on inventory items 42 and/or one of the defined areas 80 has yet to be filled, management module 15 may then select another inventory holder 30 storing, on average, five of the highest velocity inventory items 42 to position at that defined area 80. It should be noted that while particular numbers are provided by way of example, any appropriate number and/or combination of inventory holders 30 and/or pallets 34 may be positioned at inventory pier 50, and those inventory holders 30 and/or pallets 34 may store any appropriate number and/or combination of inventory items 42 of various velocities.

If at step 704 an inventory holder 30 and/or pallet holder 34 is not to be based solely on velocity but also based on expected order line completions, then at step 710 the method continues to step 712 at which the outstanding lines of orders that are satisfied by each inventory holder 30 are calculated. For example, management module 15 may determine each inventory item 42 stored by each inventory holder 30 within inventory system 10. Management module 15 may determine an amount of lines of orders that will be satisfied if that particular inventory holder is stationed at inventory pier 50. Based on the total number of outstanding lines of orders satisfied, each inventory holder may be assigned a score. Step 710 may additionally or alternatively base the selection of inventory holder 30 and/or pallet holder 34 on expected total order completions of outstanding orders in inventory system 10. For example, preferential weight may be given to an inventory holder 30 that includes a combination of one or more inventory items 42 that complete more actual orders than another inventory holder 30.

At step 714, management module 15 may determine an expected number of lines of orders to be satisfied by each inventory holder 30 and/or pallet holder 34. For example, if the inventory system 10 expects to receive a substantial number of orders for a particular inventory item 42, that may be taken into account when scoring each inventory holder 30. Based on the totals determined in step 712 and 714 a total number of lines of orders satisfied by each inventory holder 30 may be calculated at step 716, and/or an aggregate score assigned to each inventory holder 30. Step 714 may additionally or alternatively base the selection of inventory holder 30 and/or pallet holder 34 on expected total order completions of expected orders in inventory system 10. For example, preferential weight may be given to an inventory holder 30 that includes a combination of one or more inventory items 42 that are expected to complete more orders that are predicted to be made in the future than another inventory holder 30.

Based on the totals for each inventory holder the inventory holder 30 or pallet holder 34 with the highest total number of line order completions and/or best score may be determined at step 718. If the two highest inventory holders result in a tie, then the method may at step 720 proceed to step 706 where the relative velocities of available inventory items 42 in each inventory holder are calculated and one inventory holder 30 or pallet holder 34 with the highest velocity inventory item 42 may be selected at step 708. If there is no tie, then the method may proceed to step 722 and the inventory holder with the highest total order completions and/or best score may be selected. Step 718 may additionally or alternatively base the selection of inventory holder 30 and/or pallet holder 34 on the totals of expected outstanding orders completed and expected predicted orders completed. Moreover, it should also be noted that method 700 is discussed above as selecting a single inventory holder 30 placed at a single inventory pier 50 but a similar method may be used to select multiple inventory holders 30 and/or pallet holders 34 at substantially all or a substantial portion of defined areas 80 at one or more inventory piers 50. For example, method 700 may be used to select the top thirty inventory holders 30 corresponding to thirty defined areas 80 at inventory pier 50.

Figure 8:
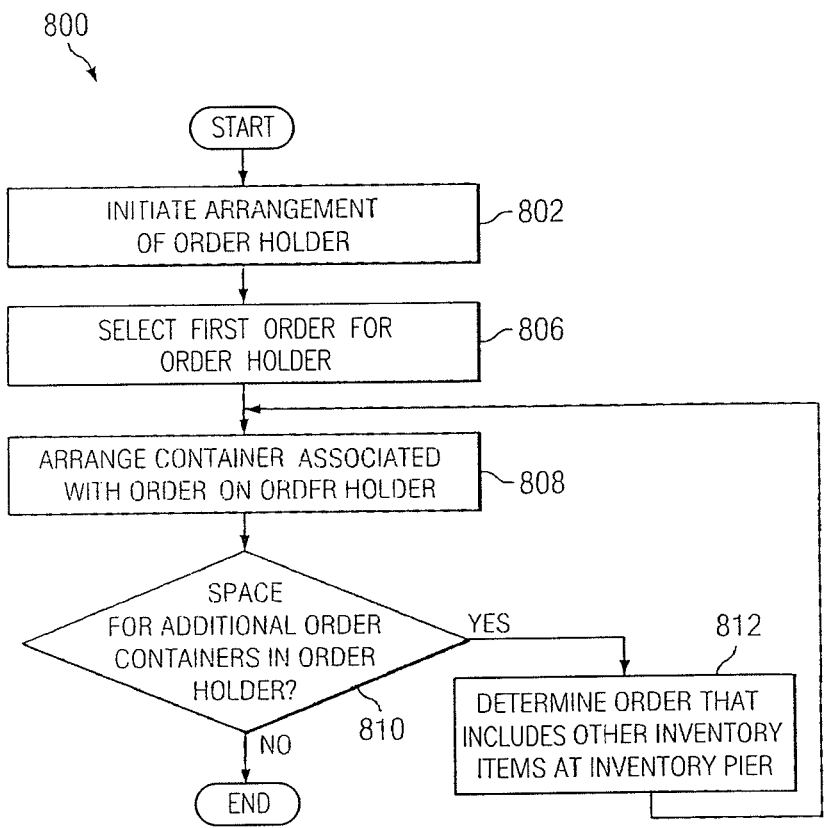
FIG. 8 is a flowchart illustrating an example of facilitating fulfillment of an order at an inventory pier.

FIG. 8 is a flowchart illustrating an example method 800 of facilitating fulfillment of an order at an inventory pier. Method 800 begins at step 802 at which arranging order holder 40 is initiated. Method 800 is an example implementation of step 612 of method 600.

At step 802, management module 15 initiates arrangement of order holder 40. For example, management module 15 may initiate arrangement of an inventory-pier only order holder 40, a mixed order holder 40, and/or an inventory-station only order holder 40. At step 806, management module 15 may select the first order to include in order holder 40. For example, outstanding orders for inventory items 42 may be examined to determine how many lines of each order request inventory items 42 located at inventory pier 50 and/or how many lines request inventory items 42 that are located in inventory storage 48. Outstanding orders may additionally or alternatively be examined to determine how many total inventory items 42 on each order are located at inventory pier 50 and/or how many total inventory items 42 on each order are located in inventory storage 48. Based on total inventory items 42 and/or total lines on each order are located at inventory pier 50, each order may be assigned a score. Based on the type of order holder 40 to be arranged and the score of each order, management module 15 may select an appropriate first order to begin arranging order holder 40. For example, for an inventory-only order holder 40, management module 15 may select a first order that has the best score, most lines of inventory items 42, and/or most total inventory items 42 located at inventory pier 50. If an inventory-station only order holder 40 is being arranged, management module 15 may select an appropriate order requesting inventory items 42 that are located in inventory storage 48. If a mixed order holder 40 is being arranged, management module 15 may select an appropriate order requesting inventory items 42 that are located at inventory pier 50 and/or in inventory storage 48. It should be noted that the order may include multiple inventory items 42 located at inventory pier 50 particularly because, as explained above, management module 15 may select inventory holders 30 and/or pallet holders 34 that are calculated to satisfy the most orders. Thus, it may be likely that a given order has all of its inventory items 42 already located at inventory pier 50.

At step 808, container 60 associated with each order selected may be arranged on order holder 40. Management module may, for example, provide instructions to an operator of induction station 54 regarding which container 60 to add to order holder 40 and/or how to associate a given order with a particular container 60. Management module 15 may additionally or alternatively instruct an operator where to place container 60 on order holder 40. For example, a particular order holder 40 may have space for a particular size and/or type of container 60 on one shelf and may have space available for a different number of a different type of container 60 on different shelves. Management module 15 may take into account the sizes and/or types of various containers 60 when arranging orders on order holder 40. If order holder 40 already has containers 60 in it associated with other orders, management module 15 may determine how to place other containers 60 in relation to those containers 60. Additionally or alternatively, management module 15 may take into account the space taken for a container 60 chosen for an order in determining whether to arrange orders onto order holder 40 at step 806 and/or step 812.

At step 810, management module 15 may determine whether additional space is available for additional order container 60 in order holder 40. If there is additional space available, then at step 812 management module 812 may determine one or more other orders to include in order holder 40. For example, management module 15 may add an order for other inventory items 42 at the inventory pier 50 and/or may add an order for other inventory items 42 at other locations within inventory system 10.

At step 812, management module 15 may additionally or alternatively determine other orders that also include inventory items at inventory pier 50. Based on the orders that include inventory items 42 that are also located at inventory pier 50, management module 15 may select orders to be arranged on order holder 40. For example, management module 15 may select two or more orders to group into order holder 40. The two or more orders may include the first order selected at step 806 and one or more other orders. Orders in addition to the first order may be selected based on the inventory items 42 requested by the first order selected. For example, orders may be grouped into order holder 40 based on having the same and/or similar inventory items 42 as the first selected order. Orders selected for arrangement on order holder 40 may, for example, be based on calculating a number of trips the mobile drive unit 20 is calculated to take to the inventory pier 50 and/or other locations in inventory system 10. Management module 15 may determine calculated savings by comparing the amount of trips that would otherwise be required to fulfill the orders if not grouped to the calculated number of the trips that would occur by selecting the two or more orders. Management module 15 may select orders to group that reduce and/or minimize the number of overall trips. Management module 15 may also select orders to group that reduce and/or minimize the number of overall task assignments generated by management module 15. For example, management module 15 may determine to reduce the number of tasks assigned to mobile drive units 20 to fill orders.

Management module 15 may select two or more orders from the available orders based on determining that the orders include only inventory items that are located in one or more of the inventory holders 30 and/or pallet holders 34 that are stationed inventory pier 50, as discussed above. For example, management module 15 may determine to arrange an inventory pier-only order holder 40, a mixed order holder 40, and/or a inventory station-only order holder 40. For various reasons, management module 15 may determine to add orders to order holder 40 that include inventory items 42 that are located at other locations within inventory system 10 such as inventory storage 48 to build a mixed order holder 40. This determination may be made based on any of the factors discussed above. The determination may be based on the workload at inventory pier 50.

As noted above, management module 15 may also take into account the locations of inventory items 42 on inventory pier 50 when determining arrangements for orders on a given order holder 40. For example, management module 15 may determine to select orders that are requesting inventory items 42 located in different inventory holders 30 at inventory pier 50. Specifically, management module 15 may determine to group orders based on determining the first order is for one inventory item 42 stored by an inventory holder 30 positioned at one defined area 80 of inventory pier 50 and determining that the second order is for another inventory item 42 stored by another inventory holder 30 positioned at another defined area 80 at inventory pier 50.

Once order holder 40 is full and/or has no additional space available at step 810, the method ends. It should be noted that while method 800 is illustrated as adding an order to order holder 40 at a time, management module 15 may determine in advance all orders and/or containers 60 that will be added to a particular order holder 40.

Modifications, additions, or omissions may be made to methods 600, 700, and 800 illustrated in the flowcharts of FIG. 6-8. For example, management module 15 is capable of assigning many tasks at once and/or in parallel. Thus, management module 15 may also process many orders in parallel and/or in sequence. Moreover, management module 15 may be capable of using inventory piers 50 to fulfill orders for any number and types of inventory facilities. Management module 15 may be capable of fulfilling orders with multiple inventory piers 50, according to the principles discussed above with respect to FIG. 4. Orders corresponding to various of those facilities may be processed by management module 15 sequentially and/or at the same time using various inventory stations 56 and/or inventory piers 50. Additionally, the steps of FIGS. 6-8 may be performed in parallel or in any suitable order. Moreover, the embodiments described with respect to the of the present disclosure are expected be fully combinable and suitable for use in appropriate embodiments described herein.

Figure 9:
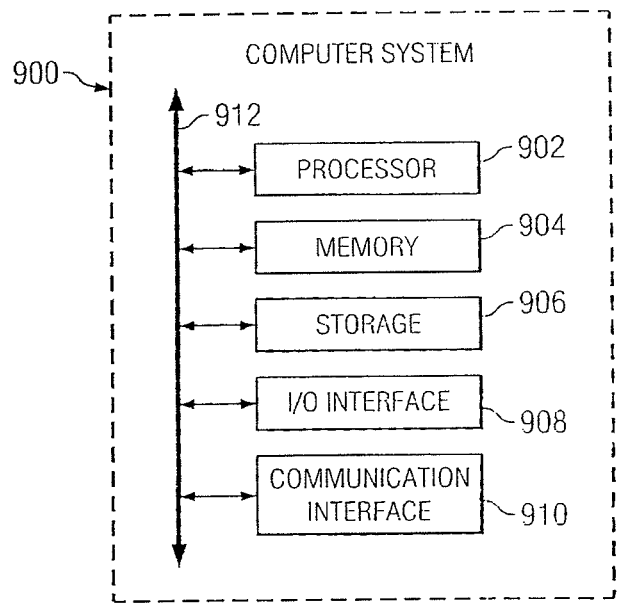
FIG. 9 illustrates an example computer system that may be used for one or more portions of the systems and method disclosed herein.

FIG. 9 illustrates an example computer system 900 that may be used for one or more portions of the systems and method disclosed herein. In particular embodiments, one or more computer systems 900 perform one or more steps of one or more methods described or illustrated herein. In particular embodiments, one or more computer systems 900 provide functionality described or illustrated herein, such as, for example, any appropriate component of system 10, such as management module 15, mobile drive unit 20 and/or inventory pier 50. In particular embodiments, software running on one or more computer systems 900 performs one or more steps of one or more methods described or illustrated herein or provides functionality described or illustrated herein. Particular embodiments include one or more portions of one or more computer systems 900.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple datacenters; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. Although this disclosure describes and illustrates a particular processor, this disclosure contemplates any suitable processor.

In particular embodiments, memory 904 includes main memory for storing instructions for processor 902 to execute or data for processor 902 to operate on. In certain embodiments, memory 904 may be memory included in any of the system 10 components discussed above, such as management module 15, mobile drive unit 20 and/or inventory pier 50. Memory 904 may store any appropriate information useful to the components of system 10, such as a plurality of orders and/or information associated with a plurality of orders received by management module 15. As an example and not by way of limitation, computer system 900 may load instructions from storage 906 or another source (such as, for example, another computer system 900) to memory 904. Processor 902 may then load the instructions from memory 904 to an internal register or internal cache. For example, processor 902 may obtain information associated with the plurality of orders stored in memory 904. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 02 to memory 904. Bus 912 may include one or more memory buses, as described below. In particular embodiments, one or more memory management units (MMUs) reside between processor 902 and memory 904 and facilitate accesses to memory 904 requested by processor 902. Although this disclosure describes and illustrates particular memory, this disclosure contemplates any suitable memory.

In particular embodiments, storage 906 includes mass storage for data or instructions. In certain embodiments, storage 906 may be included in any appropriate component of system 10, including management module 15, mobile drive unit 20 and/or inventory pier 50. Storage 906 may store any appropriate information useful to the components of system 10, such as a plurality of orders and/or information associated with a plurality of orders received by management module 15. Storage 906 may include removable or non-removable (i.e., fixed) media, where appropriate. Storage 906 may be internal or external to computer system 900, where appropriate. In particular embodiments, storage 906 is non-volatile, solid-state memory. Where appropriate, storage 906 may include one or more storages 706. Although this disclosure describes and illustrates particular storage, this disclosure contemplates any suitable storage.

In particular embodiments, I/O interface 908 includes hardware, software, or both providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 910 for it. Although this disclosure describes and illustrates a particular communication interface, this disclosure contemplates any suitable communication interface.

In particular embodiments, bus 912 includes hardware, software, or both coupling components of computer system 900 to each other. Although this disclosure describes and illustrates a particular bus, this disclosure contemplates any suitable bus or interconnect.

Herein, reference to a computer-readable storage medium encompasses one or more non-transitory, tangible, computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 902 (such as, for example, one or more internal registers or caches), one or more portions of memory 904, one or more portions of storage 906, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While particular embodiments of inventory system 10 are illustrated, it should be appreciated that the teaching of the present disclosure may be applied to any type and number of inventory systems. For example, inventory system 10 may represent a merchandise return facility. In such embodiments, inventory items may represent merchandise returned by customers. Such merchandise may be stored in inventory holders 130 when received at the facility from individual customers. At appropriate times, large numbers of units may be removed from a particular inventory holder 30 and transferred at inventory pier 50 to an order holder 40. For example, certain inventory items may be associated with a product recall, causing those inventory items to be returned in high volume. As another example, system 10 may represent a manufacturing facility, and inventory items may represent individual components of a manufacturing kit. Thus, individual items of the manufacturing kit may be stored in inventory holders 30. Orders for manufactured products may be assembled from the individual items at inventory pier 50. Final products may be transported by mobile drive units 20 using order holders and may be shipped to the appropriate destination. Thus, although a number of example embodiments are described in the present disclosure, inventory system 10 may, in general, represent any suitable facility or system for storing or processing inventory items, and inventory items may represent objects of any type suitable for storage, retrieval and/or processing in a particular inventory system 10.

Management module 15, in some embodiments, may generate task assignments independently of such inventory requests, as part of the overall management and maintenance of inventory system 10. For example, management module 15 may generate task assignments in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. In addition, while management module 15 may be configured to manage various aspects of the operation of the components of inventory system 10, in particular embodiments, the components themselves may also be responsible for decision-making relating to certain aspects of their operation, thereby reducing the processing load on management module 15. In particular, individual components may be configured to independently respond to certain localized circumstances in a manner that allows these components to improve their effectiveness without reducing the overall efficiency of inventory system 10. As one example, management module 15 may rely on the independent decision-making of the mobile drive units 20 to prevent collisions. Moreover, while the description above focuses on one or more embodiments in which mobile drive unit 20 requests paths from management module 15, mobile drive unit 20 may, in alternative embodiments, generate its own paths. Moreover, while the above description describes moving order holders 40 along one side of inventory piers 50, the teachings of the present disclosure are also applicable to configurations where conveyance equipment is situated along one side of inventory pier 50. Containers 60 may move along the conveyance equipment and stop at various locations to receive inventory items 42 in a similar manner as described above with respect to order holders 40. Moreover, in some embodiments, mobile drive units 20 may comprise conveyance equipment.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims. Moreover, while the present disclosure has been described with respect to various embodiments, it is fully expected that the teachings of the present disclosure may be combined in a single embodiment as appropriate.

What is claimed is:

1. A method, comprising:

designating, by a management module comprising logic encoded on a non-transitory media and executing on a processor, a first plurality of inventory holders to be stationed at an inventory pier, the inventory pier comprising a location designated for processing inventory items according to a plurality of orders, the inventory pier having at least a first side and a second side parallel to the first side, wherein the plurality of inventory holders are stationed at a plurality of defined areas along the first side of the inventory pier;

instructing, by the management module, one or more first mobile drive units, the one or more first mobile drive units comprising self-powered robotic devices, to transport the first plurality of inventory holders to the plurality of defined areas, wherein the first plurality of inventory holders remain stationary at the plurality of defined areas on the first side of the inventory pier while a plurality of orders are fulfilled by moving an order holder in parallel to the first side of the inventory pier along the second side of the inventory pier;

receiving an order for a plurality of inventory items;

determining, by the management module, that an inventory item requested by the order is stored in an inventory holder stationed at a defined area at the inventory pier, wherein the inventory holder is one of the first plurality of inventory holders;

based at least in part upon receiving the order and determining that the inventory item requested by the order is stored in the inventory holder stationed at the defined area, instructing, by the management module, a second mobile drive unit to transport an order holder to the second side of the inventory pier, wherein the instruction by the management module is configured to cause the second mobile drive unit to move along at least a portion of a path on the second side of the inventory pier and the order holder is operable to receive the inventory item at a first location along the second side of the inventory pier opposite to the defined area of the inventory holder, and the second mobile drive unit moves along the path from the first location towards a second location on the second side of the inventory pier, and the inventory pier is configured to process the inventory item into one of a plurality of shipping containers stored by the order holder; and based at least in part upon detecting, by the management module, a change in a product velocity associated with the inventory holder at the defined area opposite to the first location, instructing a third mobile drive unit to transport the inventory holder away from the defined area, wherein the third mobile drive unit is operable to transport the inventory holder away from the defined area while the second mobile drive unit moves towards the second location along the path on the second side of the inventory pier.

2. The method of claim 1, further comprising:
determining that the order requests an additional inventory item;
instructing the second mobile drive unit to transport the order holder to an inventory station; and
instructing one of the first mobile drive units to transport an inventory holder storing the additional inventory item from an inventory storage location to the inventory station.

3. The method of claim 1, wherein the inventory pier is a first inventory pier and the method further comprises:
determining that the order requests an additional inventory item;
instructing the second mobile drive unit to transport the order holder to a second inventory pier; and
completing the order at the second inventory pier with the additional inventory item.

4. The method of claim 1, further comprising:
activating a signal at the inventory pier that indicates that an order holder moving along the second side will stop at the first location opposite to the defined area; and
instructing an operator of the inventory pier to move to the defined area based at least in part upon the signal.

5. The method of claim 1, wherein the defined area comprises a first defined area, the inventory holder comprises a first inventory holder, and the method further comprises:
based at least in part upon a first triggering event, instructing one of the first mobile drive units to remove the first inventory holder from the first defined area and transport the first inventory holder to a drift location associated with the inventory pier;
instructing a fourth mobile drive unit to transport a second inventory holder to the first defined area; and
based at least in part upon a second triggering event, instructing one of the first mobile drive units to transport the first inventory holder from the drift location to a second defined area at the inventory pier.

6. The method of claim 1, further comprising:
determining a rate at which each of a plurality of inventory items are ordered within an inventory system;
comparing the rate associated with each of the plurality of inventory items;
based at least in part upon the comparison, selecting a number of inventory items that are ordered above a predetermined rate; and
wherein designating the plurality of inventory holders to be stationed at the plurality of defined areas is based at least in part upon determining that the number of inventory items are stored in the plurality of inventory holders.

7. A system, comprising:
an inventory pier comprising a location designated for processing inventory items according to a plurality of orders, the inventory pier having at least a first side and a second side parallel to the first side, the first side including a plurality of defined areas at which a first plurality of inventory holders are designated to be stationed, the inventory pier operable to receive inventory items from at least one of the plurality of first inventory holders at least one of the plurality of defined areas, wherein the first plurality of inventory holders remain stationary at the plurality of defined areas on the first side of the inventory pier while a plurality of orders are fulfilled by moving an order holder in parallel to the first side of the inventory pier along the second side of the inventory pier; and
a first mobile drive unit comprising a self-powered robotic device;
a management module comprising logic encoded on a non-transitory media and executing on a processor, the management module operable to:
receive an order for a plurality of inventory items;
determine that an inventory item requested by the order is stored in an inventory holder stationed at a defined area at the inventory pier, wherein the inventory holder is one of the first plurality of inventory holders;
based at least in part upon receiving the order and determining that the inventory item requested by the order is stored in the inventory holder stationed at the defined area, transmit a wireless instruction to the first mobile drive unit;
the first mobile drive unit operable to, in response to receiving the wireless instruction from the management module, transport an order holder along at least a portion of a path on the second side of the inventory pier, wherein the order holder is operable to receive the inventory item from the inventory pier at a first location along the second side of the inventory pier, the first mobile drive unit is further operable to move along the path from the first location towards a second location on the second side of the inventory pier, and the inventory pier is configured to process the inventory item into one of a plurality of shipping containers stored by the order holder; and
the management module further operable to:
detect a change in a product velocity associated with the inventory holder at the defined area; based at least in part upon detecting the change, instruct a second mobile drive unit to transport the inventory holder away from the defined area, wherein the second mobile drive unit is operable to transport the inventory holder away from the defined area while the first mobile drive unit moves towards the second location along the path on the second side of the inventory pier.

8. The system of claim 7, wherein the first location along the second side of the inventory pier is opposite to the defined area on the first side, the defined area having the inventory holder storing the inventory item.

9. The system of claim 7, wherein the system further comprises a third mobile drive unit operable to transport one or more of the first plurality of inventory holders to one or more of the defined areas at the inventory pier.

10. The system of claim 7, wherein the first plurality of inventory holders are designated for the defined areas based at least in part upon a product velocity of one or more inventory items stored in the first plurality of inventory holders.

11. The system of claim 7, wherein the first plurality of inventory holders remain stationed at the defined areas while a plurality of orders are filled.

12. The system of claim 7, wherein at least a portion of the shipping containers stored by the order holder are associated with one or more orders that request an inventory item stored in one of the first plurality of inventory holders.

13. The system of claim 7, the second mobile drive unit further operable to:

replace the inventory holder of the first plurality of inventory holders at one of the defined areas with a second inventory holder from the first plurality of inventory holders, wherein the inventory holder is replaced based at least in part upon a metric associated with the inventory holder.

14. The system of claim 7, wherein one or more of the defined areas is designated for storing a trash holder and a third mobile drive unit is operable to transport the trash holder.

15. The system of claim 7, wherein a third mobile drive unit is operable to move one of the first plurality of inventory holders to a drift location associated with the inventory pier.

16. The system of claim 7, the inventory pier further comprising an interface operable to instruct an operator of the inventory pier to remove the inventory item from the plurality of inventory holder and place the inventory item in a shipping container stored in the order holder, the shipping container associated with the order.

17. The system of claim 7, the inventory pier further comprising a first operator zone and a second operator zone, wherein the first operator zone is designated for a first operator to place inventory items into the order holder at a first subset of the defined areas and the second operator zone is designated for a second operator to place inventory items into the order holder at a second subset of the defined areas.

18. The system of claim 7, the inventory pier further comprising one or more of a flat surface, an elevated surface, and a virtual area of a workspace.

19. A system, comprising:
an inventory holder;
an order holder; and
a first mobile drive unit comprising a self-powered robotic device;
a management module comprising logic encoded on a non-transitory media and executing on a processor, the management module operable to:
receive an order for a plurality of inventory items;
determine that an inventory item requested by the order is stored in the inventory holder, wherein the inventory holder is one of the first plurality of inventory holders;
based at least in part upon receiving the order and determining that the inventory item requested by the order is stored in the inventory holder, transmit a wireless instruction to the first mobile drive unit;
the first mobile drive unit operable to:
transport the inventory holder to an inventory pier, the inventory pier comprising a location designated for processing inventory items according to a plurality of orders, the inventory pier having at least a first side and a second side parallel to the first side, wherein the inventory holder is stationed at a defined area on the first side of the inventory pier wherein the inventory holder remains stationary at the defined area on the first side of the inventory pier while a plurality of orders are fulfilled by moving an order holder in parallel to the first side of the inventory pier along the second side of the inventory pier;
transport the order holder to a first location along the second side of the inventory pier;
move the order holder along at least a portion of a path on the second side of the inventory pier from the first location towards a second location; and
reduce a speed of the order holder at or near the second location along the second side opposite to the defined area, wherein the order holder is operable to receive the inventory item from the inventory holder at the defined area while the order holder is at the reduced speed and the inventory pier is configured to process the inventory item into one of a plurality of shipping containers stored by the order holder; and
the management module further operable to:
detect a change in a product velocity associated with the inventory holder at the defined area opposite to the second location;
based at least in part upon detecting the change, instruct a second mobile drive unit to transport the inventory holder away from the defined area, wherein the second mobile drive unit is operable to transport the inventory holder away from the defined area while the first mobile drive unit moves away from the second location along the path on the second side of the inventory pier.

20. The system of claim 19, wherein the inventory holder is a first inventory holder and the second mobile drive unit is further operable to replace the first inventory holder with a second inventory holder, and the management module is further operable to instruct the second mobile drive unit to replace the first inventory holder with the second inventory holder based at least in part upon comparing a first metric associated with the first inventory holder to a second metric associated with the second inventory holder.

21. The system of claim 20, wherein the first metric comprises one or more of:
a quantity of inventory items stored in the first inventory holder; and
a velocity of inventory items stored in the first inventory holder.

22. The system of claim 20, wherein the first metric comprises a first expected demand, the second metric comprises a second expected demand, and the management module is further operable to schedule the first inventory holder to be replaced by the second inventory holder at a particular time based at least in part upon determining the second expected demand is predicted to exceed the first expected demand at the particular time.

23. The system of claim 19, wherein the first and second mobile drive units are operable to transport the inventory holder by:
moving underneath the inventory holder;
raising a docking head towards a surface of the inventory holder;
lifting the inventory holder using the docking head; and
moving the lifted inventory holder.

24. The system of claim 19, the management module further operable to:
determine that the inventory holder should be rotated; and
based at least in part upon determining that the inventory holder should be rotated, instruct the first mobile drive unit to:
move the inventory holder away from the defined area;
rotate the inventory holder; and
move the inventory holder back to the defined area.

* * * * *